(12) United States Patent
Ulmanella

(10) Patent No.: US 8,092,664 B2
(45) Date of Patent: Jan. 10, 2012

(54) ELECTROWETTING-BASED VALVING AND PUMPING SYSTEMS

(75) Inventor: Umberto Ulmanella, Foster City, CA (US)

(73) Assignee: Applied Biosystems LLC, Carlsbad, CA (US)

( * ) Notice: Subject to any disclaimer, the term of this patent is extended or adjusted under 35 U.S.C. 154(b) by 0 days.

(21) Appl. No.: 12/793,548

(22) Filed: Jun. 3, 2010

(65) Prior Publication Data

US 2011/0083964 A1 Apr. 14, 2011

Related U.S. Application Data

(63) Continuation of application No. 11/383,133, filed on May 12, 2006, now abandoned.

(60) Provisional application No. 60/680,889, filed on May 13, 2005.

(51) Int. Cl.
G01N 27/453 (2006.01)
F16K 31/02 (2006.01)

(52) U.S. Cl. .............. 204/600; 251/129.01; 251/129.06; 251/129.08; 422/503

(58) Field of Classification Search .................. 204/600, 204/450; 251/129.1, 129.06, 129.08; 422/82
See application file for complete search history.

(56) References Cited

U.S. PATENT DOCUMENTS

| 6,379,929 | B1* | 4/2002 | Burns et al. ................. 435/91.2 |
| 6,565,727 | B1* | 5/2003 | Shenderov .................... 204/600 |
| 2002/0043463 | A1* | 4/2002 | Shenderov .................... 204/450 |
| 2003/0006140 | A1* | 1/2003 | Vacca et al. .................. 204/547 |
| 2004/0231987 | A1* | 11/2004 | Sterling et al. ................ 204/450 |
| 2006/0153745 | A1* | 7/2006 | Ermakov ...................... 422/130 |

* cited by examiner

*Primary Examiner* — Alex Noguerola

(57) ABSTRACT

The present teachings relate to microfluidic valves and pumping systems, which may be suitable for controlling and facilitating liquid flow. Electrodes are disposed proximately to volumes containing a liquid. The liquid flow can be facilitated by electrowetting forces. Processes for controlling the flow of liquids, as well as for pumping liquids, are also disclosed.

28 Claims, 18 Drawing Sheets

ELECTROWETTING-BASED VALVING AND PUMPING SYSTEMS

CROSS REFERENCE TO RELATED APPLICATIONS

This application is a continuation of U.S. application Ser. No. 11/383,133, filed May 12, 2006, now abandoned, which claims the benefit of U.S. Provisional Application No. 60/680,889, filed May 13, 2005, all of which are hereby incorporated in their entirety by reference.

FIELD

The present teachings relate to microfluidic valves and pumping systems suitable for controlling and facilitating liquid flow.

INTRODUCTION

One of the challenges encountered in devices, for example, microfluidic devices designed for high throughput operations, is effective control of fluid flow, for example liquid flow. Pumps may be an important aspect of microfluidic devices. A diversified range of microfluidic pumps has been, and continues to be, developed. It may be difficult to individually and independently control fluid flow in thousands of microchannels without requiring fabrication of sophisticated valving and pumping systems, which may substantially increase the cost of manufacturing microfluidic devices. Addressing and actuating individual pumps and valves in a device may be very complex. It could be desirable to devise a method for manipulating fluid flow inside a device, for example a microfluidic device, with great flexibility and, more specifically, employ valves and pumps that can be easily and independently actuated. The use of such systems could make it practical to implement a variety of devices, such as lab-on-a-chip devices.

One aspect of the present disclosure relates to an electrowetting-based microfluidic valve. Such a device may be capable of reversibly metering the flow of an operating liquid. The valve operates by placing and removing a fluidic physical obstruction, which may be a complete or partial obstruction, e.g. a gas or a liquid immiscible with the operating liquid, along a fluidic channel. When the obstruction is in place, the flow of an operating liquid is at least partially, if not completely, blocked. The actuation of such a droplet or bubble may be achieved by reversibly switching the physical characteristics of the contacting boundary from hydrophilic to hydrophobic, and vice versa. Such a change may be obtained from electrowetting.

Another aspect of the present disclosure relates to electrowetting-based microfluidic pumps. The pumps can move liquids by a number of means, such as by positive-displacement reciprocation of a fluid immiscible with the operating liquid. Another pump can employ liquid vanes that effectively propel the operating liquid. Like the valve, the actuation of the fluidic obstruction and the operating liquid can be produced by electrowetting.

Electrowetting (EW) and Electrowetting on Dielectric (EWOD) use electric fields to effect fluid movement by relying on the ability of electric fields to change the contact angle of the fluid on a surface that is initially resistant to the flow of a liquid. When an electric field gradient is applied to a droplet on a fluid-transporting surface, different contact angles are formed between leading and receding surfaces of the droplet with respect to the fluid transporting surface. This imbalance in surface tension forces will produce a net force that moves the droplet. EWOD may be distinguished from EW in that the former relies upon a thin layer of a dielectric film disposed on the surface of at least one electrode. The dielectric film provides a degree of dielectric capacitance between at least a portion of a surface of an electrode and the liquid. This may facilitate more precise control of fluid movement, and may also minimize, if not eliminate, electrolysis.

SUMMARY

In various embodiments, the present teachings can provide a valving system comprising a channel fluidly coupled to a first reservoir and a second reservoir; a volume in fluid communication with said channel, wherein said volume is adapted to contain a fluid chosen from a gas bubble and a liquid droplet; a first electrode proximate to said volume; a second electrode proximate to said channel, wherein said first and second electrodes are proximate to each other; and a power source electrically coupled to each electrode, the power source being configured to provide an electrical potential difference at the interface between the electrode and a liquid droplet sufficient to provide a net force to move said droplet.

In various embodiments, the present teachings can provide a pumping system comprising a first channel fluidly coupled to a first reservoir and a second reservoir, said first channel being divided into at least a first section, a second section, and a third section; a third reservoir opening into said second section of said first channel, said third reservoir comprising a first chamber and a second chamber; a plurality of electrodes comprising an electrode proximate to each of said first section, second section, third section, first chamber and second chamber; and a power source electrically coupled to each electrode, the power source being configured to provide an electrical potential difference at the interface between the electrode and a liquid droplet sufficient to provide a net force to move said droplet.

In various embodiments, the present teachings can provide a valving system comprising a first channel fluidly coupled to a first reservoir; a second channel fluidly coupled to said first channel, said second channel having a first volume adapted to contain a fluid chosen from a gas bubble and a liquid droplet; a second volume comprising said first volume and at least a portion of said first channel; a third channel fluidly coupled to said second volume, wherein said third channel comprises at least one section; a third volume opening into said at least one section; a fourth channel fluidly coupled to a second reservoir; a fifth channel fluidly coupled to said first channel, said fifth channel having a fourth volume adapted to contain a fluid chosen from a gas bubble and a liquid droplet; a fifth volume comprising said fourth volume and at least a portion of said fourth channel; an electrode proximate to each of said volumes and channels; and a power source electrically coupled to each electrode, the power source being configured to provide an electrical potential difference at the interface between the electrode and a liquid droplet sufficient to provide a net force to move said droplet.

In various embodiments, the present teachings can provide a pumping system suitable for a microfluidic device, comprising: a delivery channel; an intake channel; a volume fluidly connected to said delivery channel and said intake channel; a hub extending through said volume; a plurality of electrodes proximate to said volume; and a power source electrically coupled to each electrode, the power source being configured to provide an electrical potential difference at the interface between the electrode and a liquid droplet sufficient to provide a net force to move said droplet.

In various embodiments, the present teachings can provide a pumping system suitable for a microfluidic device, comprising a first reservoir; a second reservoir; a volume between the two reservoirs adapted to contain an fluid chosen from a gas bubble and a liquid droplet; at least one electrode proximate to said volume; a first channel and a second channel allowing liquid to flow between said first reservoir and said volume; a third channel and a fourth channel allowing liquid to flow between said second reservoir and said volume; and a power source electrically coupled to said at least one electrode, the power source being configured to provide an electrical potential difference at the interface between the electrode and a liquid droplet sufficient to provide a net force to move said droplet.

In various embodiments, the present teachings can provide a valving system comprising a reservoir, a channel fluidly connected to said reservoir, at least one electrode associated with said channel, said electrode being proximate to the intersection of said reservoir and said channel; and a power source electrically coupled to said at least one electrode, the power source being configured to provide an electrical potential difference at the interface between the electrode and a liquid droplet sufficient to provide a net force to move said droplet.

In various embodiments, the present teachings can provide a valving system comprising a channel fluidly coupled to a reservoir; a plurality of electrodes comprising a first electrode proximate to said channel; a second electrode proximate to an edge of said first electrode and proximate to said reservoir; a third electrode proximate to an edge of said second electrode and proximate to said reservoir; and a power source electrically coupled to each electrode, the power source being configured to provide an electrical potential difference at the interface between the electrode and a liquid droplet sufficient to provide a net force to move said droplet.

In various embodiments, the present teachings can provide a process for controlling the flow of a liquid from a reservoir to a channel, wherein said reservoir is fluidly connected to said channel; a first electrode is proximate to said reservoir and the intersection of said reservoir and said channel; a second electrode is proximate to said channel and is proximate to, and in substantially the same plane as, said first electrode; a fluidic obstruction substantially immiscible with said liquid is located proximate to at least one of said first and second electrodes; and a power source is electrically connected to said first and second electrodes to form first and second circuits, respectively; said process comprising alternately opening and closing said circuits to alternately cause said fluidic obstruction to transit between the surfaces of said first and second electrodes, thereby alternately blocking the flow of said liquid from said reservoir into said channel.

In various embodiments, the present teachings can provide a process for controlling the flow of a liquid from a first reservoir to a second reservoir in an apparatus comprising a channel disposed between, and in fluid communication with, a first reservoir and a second reservoir; a volume between said first and second reservoirs, wherein said volume comprises a first chamber and a second chamber, and said second chamber comprises at least a portion of said channel, and wherein one of said first and second chambers comprises a fluidic obstruction substantially immiscible with said liquid; a first electrode proximate to said first chamber, and a second electrode proximate to said second chamber; and a power source electrically connected to said first and second electrodes to form a first circuit between said power source and said first electrode, and a second circuit between said power source and said second electrode, said process comprising alternately opening and closing said first and second circuits to cause said fluidic obstruction to transit between said first chamber and said second chamber.

In various embodiments, the present teachings can provide a process for pumping a liquid from a first volume to a second volume, comprising providing a fluid substantially immiscible with said liquid in a third volume, wherein said third volume is disposed between, and in fluid communication with, said first and second volumes, and wherein said third volume comprises a first chamber and a second chamber; alternately applying an electric current across said first and second chambers, thereby causing the fluid to alternately transit between said first and second chambers, thereby drawing the liquid from said first volume, through at least a portion of said third volume, and into said second volume.

In various embodiments, the present teachings can provide a process for pumping a liquid from a first reservoir to a second reservoir, wherein a channel fluidly connects said first reservoir to said second reservoir; a third volume comprising a first chamber and a second chamber opens into said channel; a first electrode is proximate to said first chamber; a second electrode is proximate to, and in substantially the same plane as, said second chamber; a fluid substantially immiscible with the liquid is located in one of said first and second chambers; and a power source is electrically connected to said first and second electrodes to form a first circuit between said power source and said first electrode, and a second circuit between said power source and said second electrode, said process comprising alternately opening and closing said first and second circuits to cause said fluid to transit between said first chamber and said second chamber, thereby drawing the liquid from said first reservoir, through said channel, and into said second reservoir.

In various embodiments, the present teachings can provide a process for pumping a liquid in an apparatus comprising a reservoir comprising a first surface, an opposing second surface, and a hub disposed between said first and second surfaces; a first channel and a second channel, each of which is in independent fluid communication with said reservoir; a plurality of electrodes disposed in substantially the same plane under said first surface, wherein said plurality of electrodes is arranged around said hub; a power source electrically connected to each of said electrodes; and at least one vane comprising a fluid substantially immiscible with said liquid, wherein said at least one vane is disposed over at least one of said plurality of electrodes; said process comprising alternately applying an electric current to said electrodes to cause said at least one vane to transit around said hub, thereby drawing the liquid from said first channel, into said reservoir, and out said second channel.

It is to be understood that both the foregoing general description and the following description of various embodiments are exemplary and explanatory only and are not restrictive.

BRIEF DESCRIPTION OF THE DRAWINGS

The accompanying drawings, which are incorporated in and constitute a part of this specification, illustrate various embodiments. In the drawings.

DESCRIPTION OF VARIOUS EMBODIMENTS

Figure 1A:
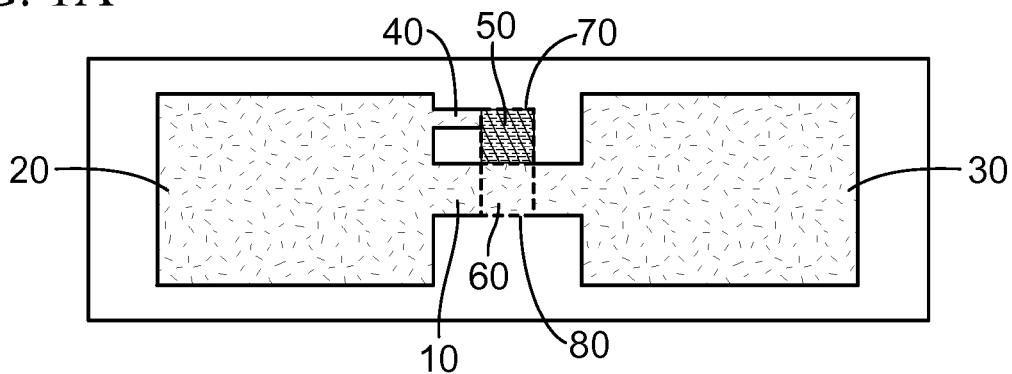
FIGS. 1A-1D illustrate a valving system according to the present teachings.

Reference will now be made to various exemplary embodiments, examples of which are illustrated in the accompanying drawings. Wherever possible, the same reference numbers are used in the drawings and the description to refer to the same or like parts.

FIGS. 1A-1D illustrate an exemplary embodiment of an electrowetting-based valving system as disclosed herein. The valving system can be suitable for a microfluidic device. The valve comprises a main channel 10 fluidly connected to reservoirs 20 and 30. The valve comprises chambers 50 and 60 and optional channel 40. Optional channel 40 can be fluidly connected to reservoir 20 as shown, and can also or alternatively be vented to the atmosphere. Channel 40 need not be present when, for example, chamber 50 contains a fluidic obstruction comprising a gas. Electrode 70 is proximate to chamber 50, and electrode 80 is proximate to chamber 60. For example, the electrodes are disposed under the surfaces of chambers 50 and 60, respectively. At least one ground electrode may be disposed on the opposite side chambers 50 and 60 from said electrodes 70 and 80. A power source is electrically coupled to said electrodes.

FIG. 1A illustrates the valve in the open position. Chamber 50 is filled with a fluidic obstruction, for example an oil droplet, immiscible with the operating liquid, for example an aqueous liquid such as saline. The operating liquid is pumped from reservoir 20 to reservoir 30. In the open position, the surface of chamber 50 is made hydrophobic by switching electrode 70 off (no voltage differential applied at the interface between the electrode and the liquid). At the same time, the surface of chamber 60 is made hydrophilic by switching electrode 80 on (a sufficiently high difference in potential is applied at the interface between the electrode and the liquid). The hydrophilic operating liquid is permitted to flow from reservoir 20 to reservoir 30 while the hydrophobic oil droplet remains in chamber 50.

Figure 1B:
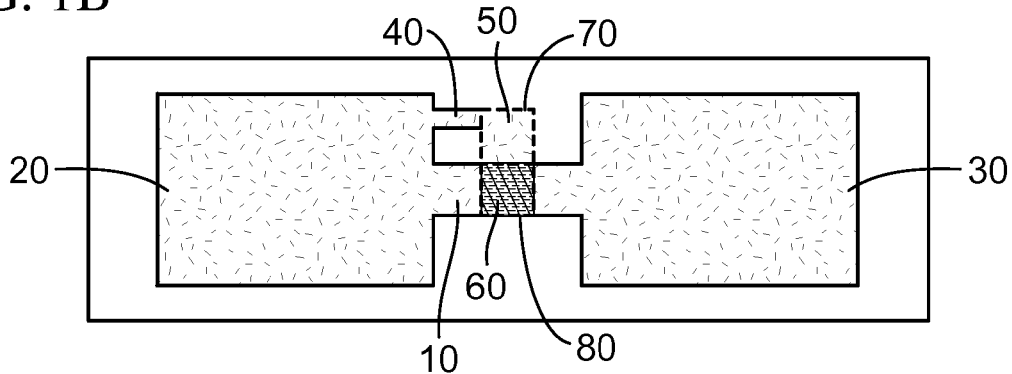

In the closed position, and as illustrated in FIG. 1B, electrode 70 is switched on and electrode 80 is switched off. As a result, the oil droplet moves from chamber 50 to chamber 60. Channel 40 as shown facilitates displacement of the oil droplet by allowing operating liquid from chamber 50 to fill reservoir 20. In an alternative embodiment (not shown), channel 40 is vented to the atmosphere. The main channel 10 is blocked by the oil droplet in chamber 60 and the flow of operating liquid from reservoir 20 to reservoir 30 is obstructed. The valve may be reversibly switched to the open position (FIG. 1A) by re-establishing the initial conditions: electrode 70 is switched off and electrode 80 is switched on.

Figure 1C:
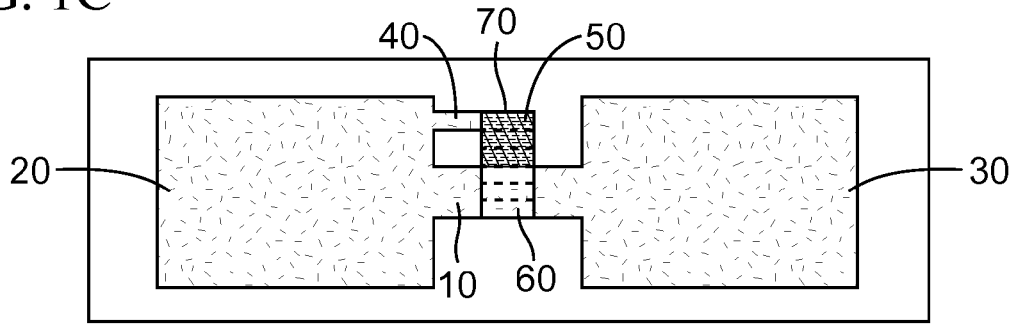
Figure 1D:
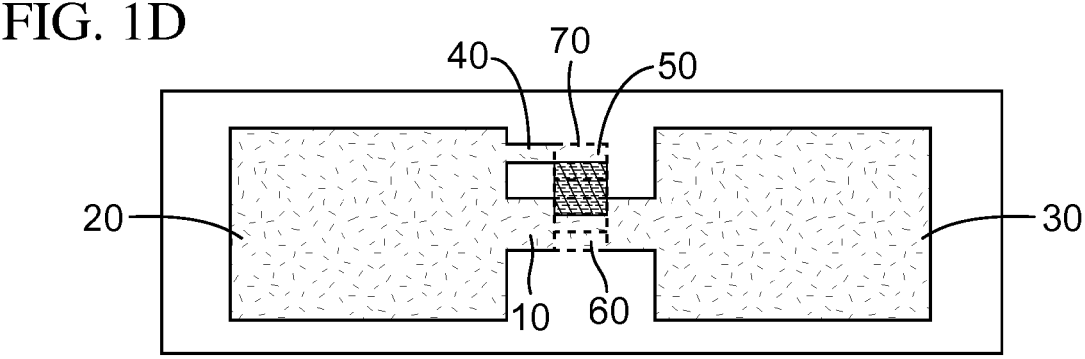

FIG. 1C illustrates another embodiment of the present disclosure, whereby a plurality of electrodes is employed. According to one embodiment, six electrodes are employed, all though as few as two and as many as 1000 electrodes may be used. The hydrophobic fluidic obstruction remains in volume 50, and the aqueous operating liquid is permitted to flow from reservoir 20, through channel 10, and into reservoir 30. By switching on and off various combinations of electrodes, the fluidic obstruction can transit from volume 50 and into at least a portion of channel 10. As shown in FIG. 1D, this has the effect of partially blocking the flow of the operating liquid from reservoir 20. The flow of the operating liquid may be halted by transiting the fluidic obstruction into channel 10 so that the channel is completely blocked.

With proper adjustments, the same principle may be used if the operating liquid is hydrophobic. In this case, the fluidic obstruction (i.e., the liquid immiscible with the operating liquid) can be hydrophilic, while the actuation of the valve will occur in the reverse order. As discussed below, modifications to this basic design can be implemented to prevent the fluidic obstruction from escaping from the valve seat, to extend the operation range of the valve in terms of sustained pressure differential, to increase its performance, etc.

Figure 2A:
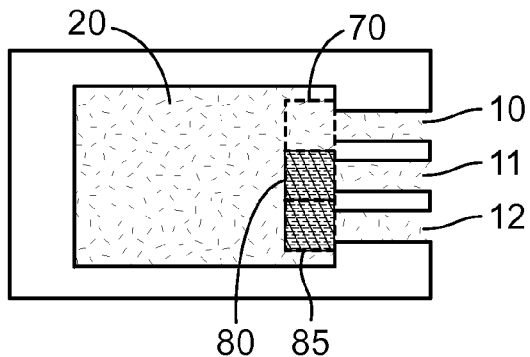
FIGS. 2A-2B illustrate a valving system according to the present teachings.
Figure 2B:
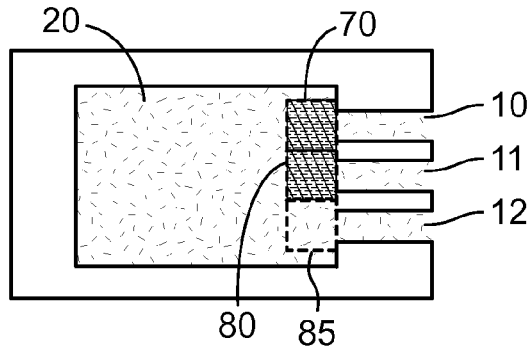

FIGS. 2A-2B illustrate another embodiment of a valving system whereby reservoir 20 is in fluid communication with channels 10, 11, and 12. Electrodes 70, 80, and 85 are proximate to the intersections of each channel with reservoir 20. Although FIG. 2 illustrates an embodiment comprising three channels and three electrodes, additional channels (and associated electrodes) can also be included. According to one embodiment, the three electrodes are adjacent to each other, and may have interdigitated sawtooth outlines.

The valving system of FIG. 2 can be useful when a single reservoir dispenses liquid to multiple locations at the respective termini of channels 10, 11, and 12. As shown in FIG. 2A, and taking the operating liquid to be aqueous and the fluidic obstructions to be hydrophobic, electrode 70 is switched on and electrodes 80 and 85 are switched off. The fluidic obstructions block channels 11 and 12, while the operating liquid can flow from reservoir 20 into channel 10. In FIG. 2B, electrodes 70 and 80 are switched off, and electrode 85 is switched on. The fluidic obstruction transits to the areas over electrodes 80 and 85, thereby blocking the flow of the operating liquid into channels 10 and 11. The fluidic obstruction no longer blocks channel 12, and the operating liquid is permitted to flow from reservoir 20 and into channel 12.

Figure 3A:
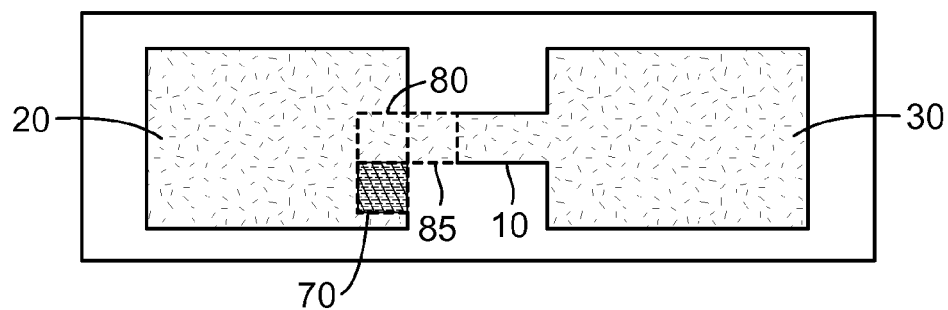
FIGS. 3A-3B illustrate a three-electrode valving system according to the present teachings.
Figure 3B:
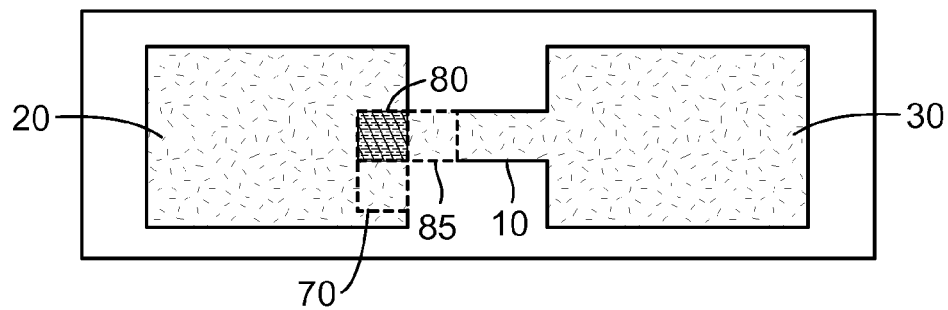

FIGS. 3A-3B illustrate another embodiment of a valving system in accordance with the present disclosure, whereby channel 10 permits fluidic communication between reservoirs 20 and 30. Electrodes 70, 80, and 85 are positioned proximate to each other and to the intersection of reservoir 20 and channel 10. In FIG. 3A, electrodes 80 and 85 are switched on and electrode 70 is switched off. The hydrophobic fluidic obstruction is positioned over electrode 70, and the hydrophilic operating liquid flows from reservoir 20, through channel 10, and into reservoir 30. In FIG. 3B, electrode 80 is switched on and electrodes 70 and 85 are switched off. The fluidic obstruction transits to the area over electrode 80, and the flow of the operating liquid into channel 10 is at least partially blocked. Electrode 85 can be switched on and electrodes 80 and 90 can be switched off. In this configuration (not shown), the fluidic obstruction would be seated in channel 10, thereby blocking flow of operating liquid to reservoir 30.

Figure 4A:
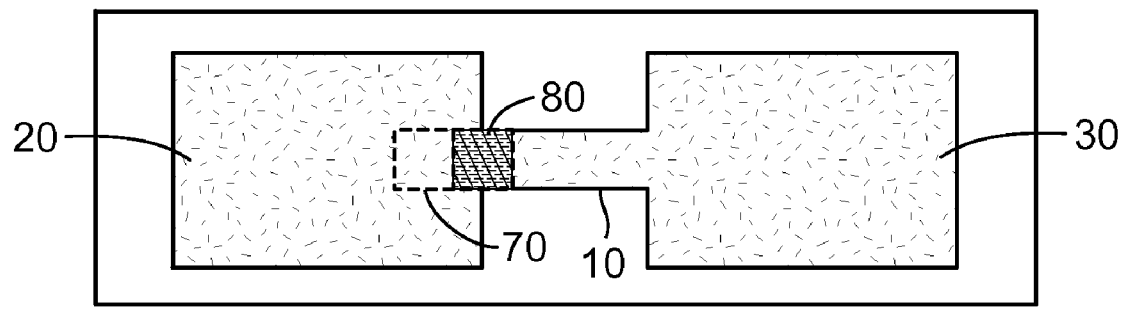
FIGS. 4A-4B illustrate a two-electrode valving system according to the present teachings.
Figure 4B:
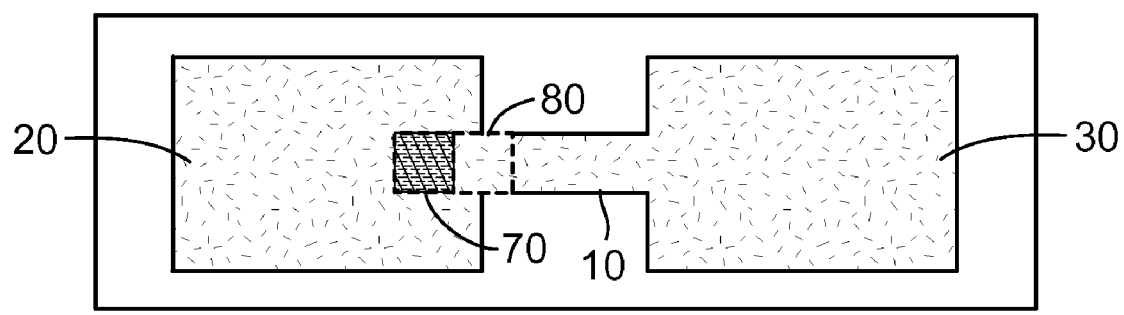

FIGS. 4A-4B illustrates yet another embodiment, whereby electrode 70 is proximate to electrode 80, which is proximate to the fluidic intersection of reservoir 20 and channel 10. When electrode 70 is switched on and electrode 80 is switched off (as illustrated in FIG. 4A), the hydrophobic fluidic obstruction blocks channel 10, thereby prohibiting the flow of the hydrophilic operating liquid from reservoir 20 to reservoir 30. When electrode 70 is switched off and electrode 80 is switched on, the fluidic obstruction moves out of the fluidic intersection and permits the flow of the operating liquid into channel 10.

Figure 5A:
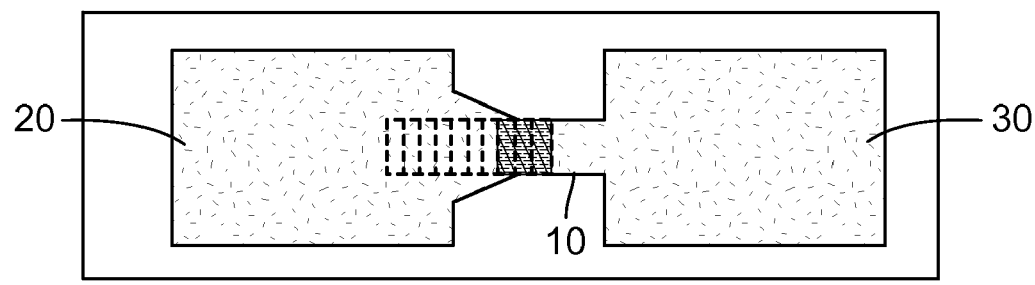
FIGS. 5A-5D illustrate a proportional valving system according to the present teachings.
Figure 5B:
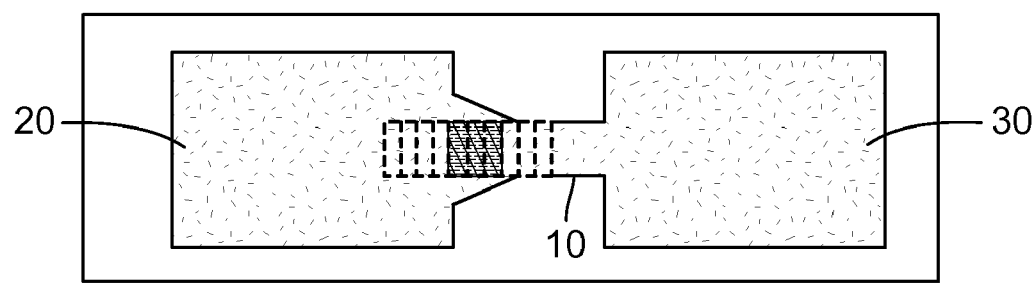
Figure 5C:
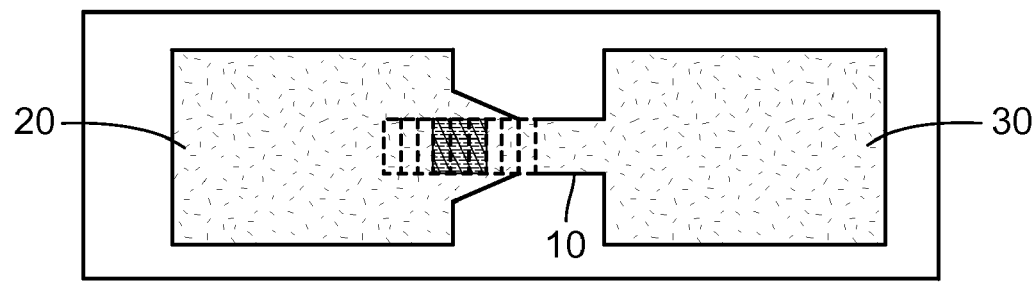
Figure 5D:
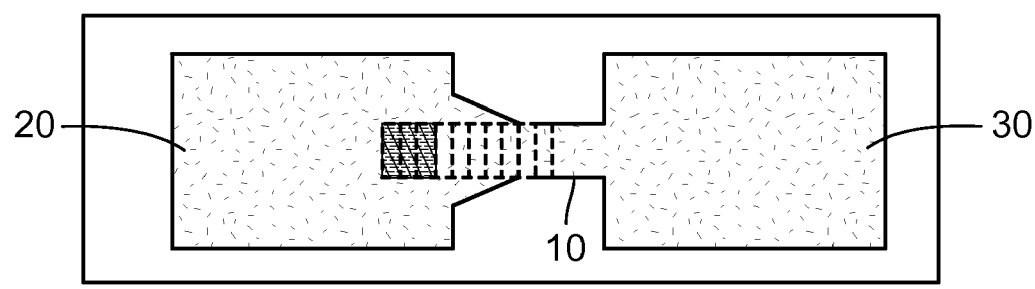

FIGS. 5A-5D illustrate an embodiment whereby a plurality of electrodes is employed to modulate the flow of an aqueous operating liquid from reservoir 20 to reservoir 30. In FIG. 5A, the electrodes within channel 10 are switched off and the hydrophobic fluidic obstruction blocks the flow of the operating liquid. As illustrated in FIGS. 5B-5D, the flow of the operating liquid to reservoir 30 can be gradually increased by causing the fluidic obstruction to transit further into reservoir 20 and away from the fluidic intersection of reservoir 20 and channel 10.

Figure 6A:
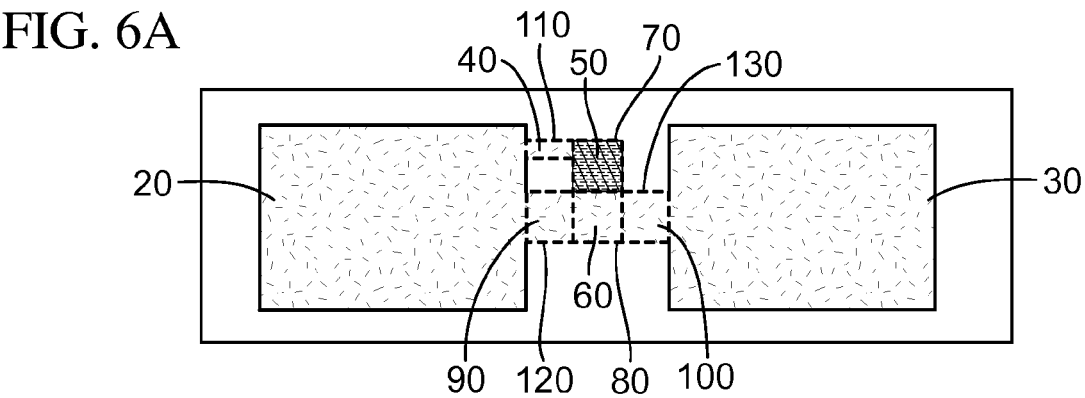
FIGS. 6A-6B illustrate a valving system according to the present teachings.
Figure 6B:
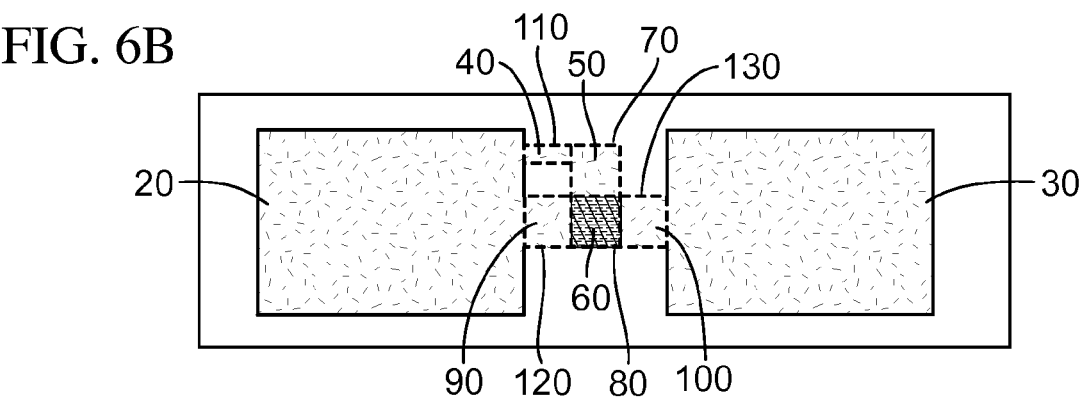

FIGS. 6A-6B illustrate a solution that may be implemented in the case that forces, for example surface forces arising from hydrophobic boundaries (which may result from materials commonly used in microfluidic practice, such as PDMS and SU-8) can destabilize the fluidic obstruction, in this case an oil droplet, and draw the fluidic obstruction into optional channel 40 and/or away from electrode 80 in channel 10. According to one embodiment, with reference to FIG. 6A, the surfaces of channel sections 90 and 100, and optional channel 40 can be made hydrophilic by a hydrophilic treatment, such as by silanization. According to another embodiment, additional electrodes 110, 120 and 130 may be disposed under the surface of channel sections 90 and 100, and optional channel 40. The three additional electrodes will be alternatively, or continuously, switched on to ensure the oil droplet is surrounded by hydrophilic surfaces. Alternatively, according to an embodiment whereby the operating liquid is hydrophobic and the fluidic obstruction is hydrophilic, the surfaces of channel sections 90 and 100, and channel 40 can be made hydrophobic to stabilize the location of the hydrophilic droplet. This can be accomplished by keeping electrodes 110, 120, and 130 in the off position.

Figure 7A:
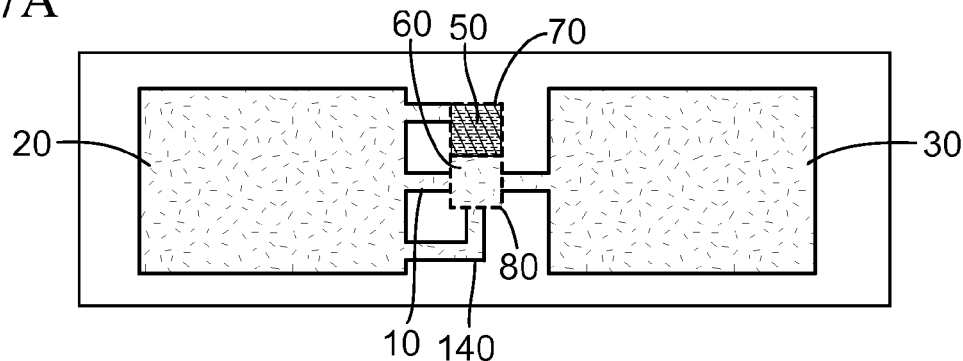
FIGS. 7A-7B illustrate a valving system containing an additional channel, according to the present teachings.
Figure 7B:
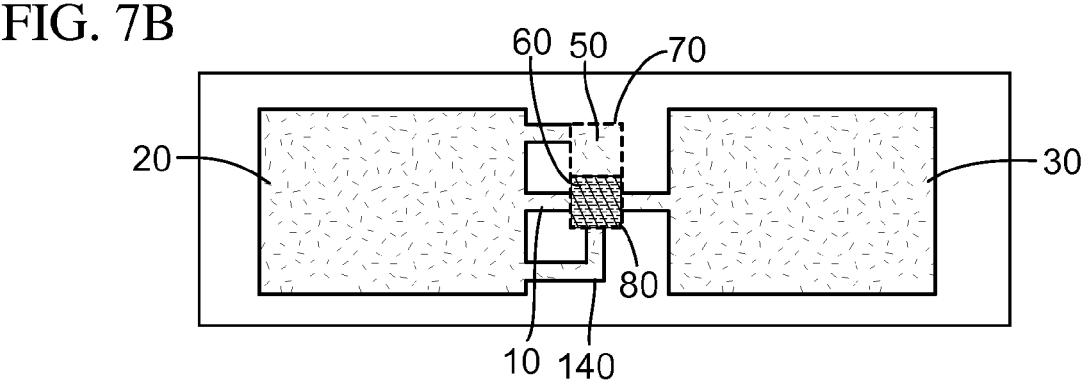

FIGS. 7A-7B illustrate an additional embodiment suitable for stabilizing the oil droplet (seated in chamber 50 in FIG. 7A, and chamber 60 in FIG. 7B). An additional channel 140 is fluidly connected to reservoir 20 and chamber 60, and may be used to further drain the operating liquid from the valve seat when the oil droplet is displaced into chamber 60. This embodiment is suitable whether the operating liquid is hydrophobic or hydrophilic.

Figure 8A:
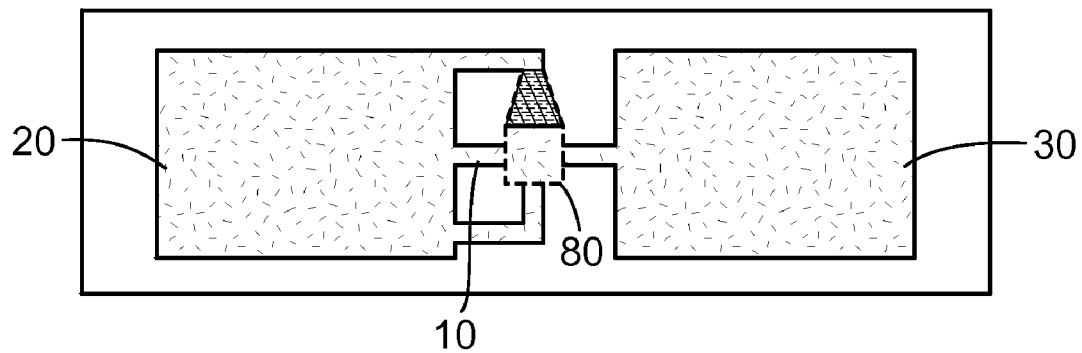
FIGS. 8A-8B illustrate valving system having a trapezoidal-shaped chamber, according to the present teachings.
Figure 8B:
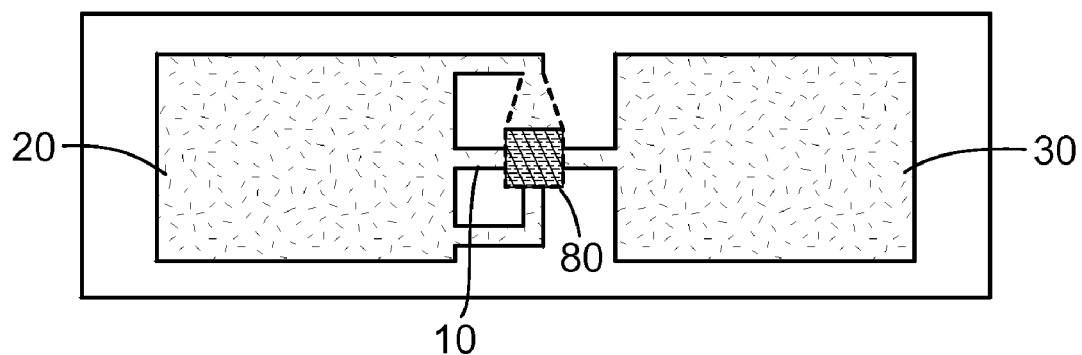

Actuation of the valves disclosed herein can be facilitated by altering the shape of chamber 50. According to one embodiment, and as illustrated in FIG. 8A (showing an "open" valve) and FIG. 8B (showing a "closed" valve), the shape is trapezoidal. The trapezoidal shape may produce an imbalance in the forces acting upon the fluidic obstruction, generally along its displacement. This would have the effect of accelerating the motion of the droplet both into channel 10 and into the recess.

Another aspect of the present disclosure relates to micropumps suitable for microfluidic applications. The micropumps disclosed herein operate by positive displacement of the operating liquid, while the actuation is provided by electrowetting principles. These devices can deliver a liquid, for example an electrolytic liquid, in single phase form (absence of air bubbles) or in a multiphase form.

The layout and operation of the pumps disclosed herein are inspired by traditional reciprocating piston, positive-displacement pumps. Suitable components of the pumps disclosed herein include valves, a pumping chamber or array of pumping chambers disposed between the valves, electrodes to (1) actuate the liquid motion into and from the chambers and (2) operate the valve. The operation of the pumps disclosed herein comprises a "fill" phase, during which the operating liquid is aspired from the intake to fill the chamber, and the "delivery" phase, during which the working fluid is delivered from the chamber. The "intake" and "delivery" valves will open and close alternatively to prevent backflow during the two phases.

FIG. 9 illustrates the operation of a micropump disclosed herein. Reservoirs 20 and 30 are fluidly connected via channel 10, which is divided into an inlet section 90, a center section 210, and an outlet section 100. Channel section 90 and chamber 230 can be fluidly connected to optional air vent 40. For the purpose of illustrating the operation of this embodiment, the operating liquid is taken to be an aqueous liquid.

Figure 9A:
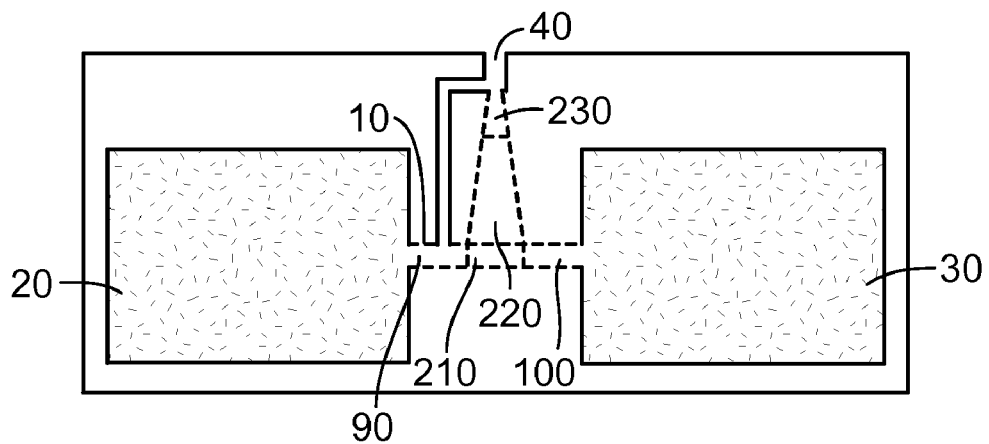
FIGS. 9A-9I illustrate the operation of a microfluidic pump according to the present teachings.

In FIG. 9A, the micropump is inactive—all electrodes proximate to channel 10 and chambers 220 and 230 are switched off and channel 10 and chambers 220 and 230 are filled with air. This prevents the hydrophilic operating fluid from spontaneously filling components of the pump, and also prevents any undesirable flow between channel 10 and reservoir 20.

Figure 9B:
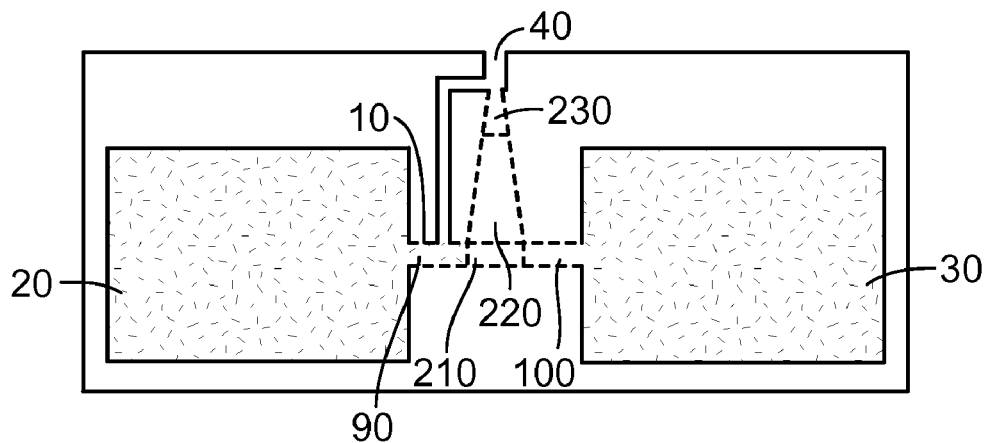
Figure 9C:
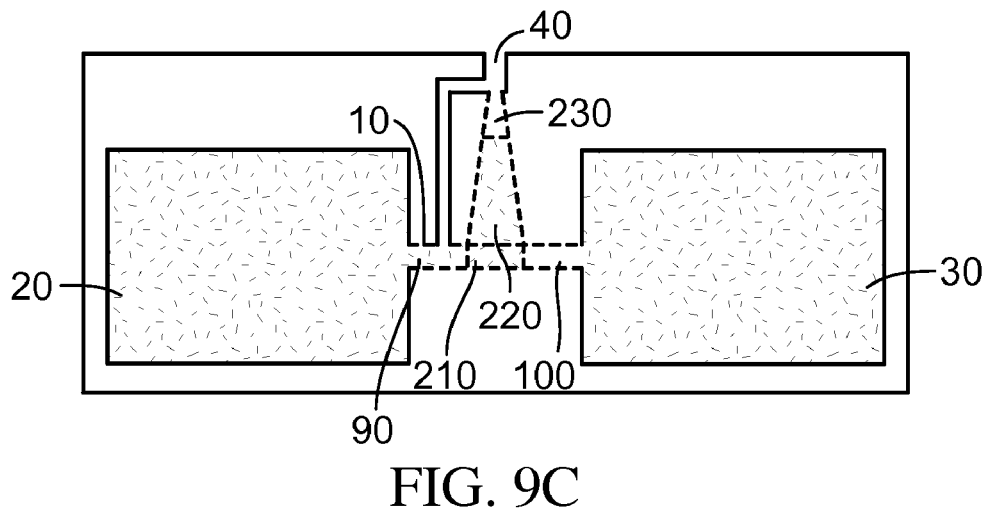
Figure 9D:
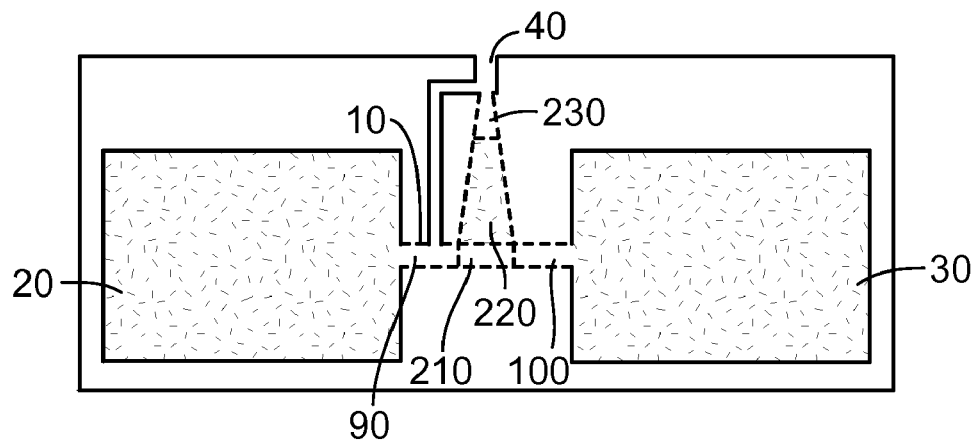
Figure 9E:
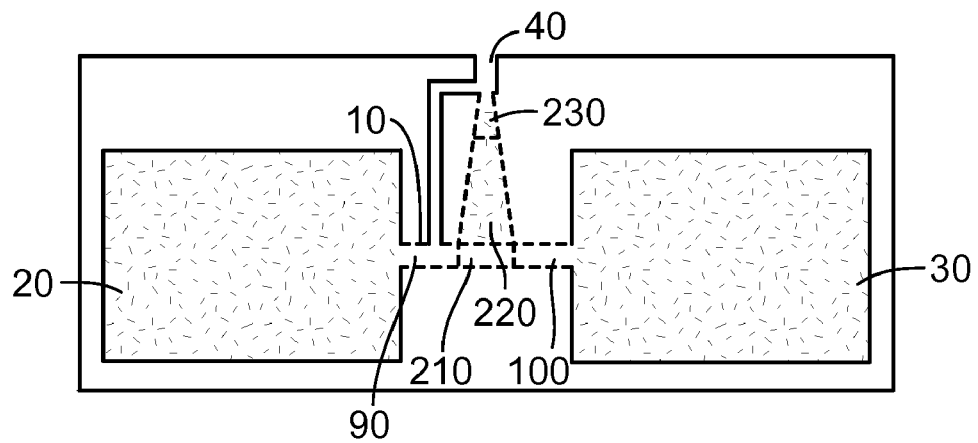
Figure 9F:
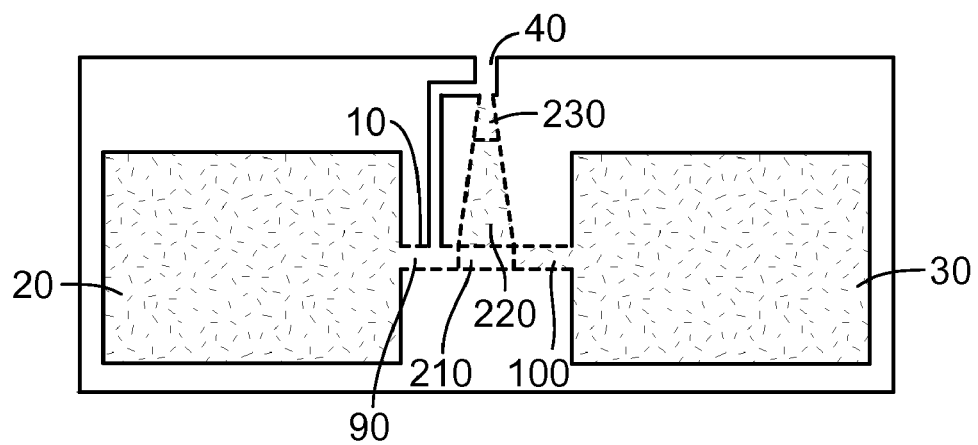

The "fill" phase begins with the opening of the intake valve (FIG. 9B). This is initiated by switching on the electrode proximate to section 90, thus changing the physical characteristics of the contacting boundary from hydrophobic to hydrophilic. This change permits the operating liquid to flow into section 90. The second step includes filling chamber 220 by switching on the electrodes associated with section 210 and chamber 220 (FIG. 9C). To complete the "fill" phase (FIG. 9D), the intake valve is closed, i.e., the liquid is displaced from the intake section (section 90) by switching off the electrode proximate to section 90. Chamber 230 is subsequently filled by switching on the electrode proximate thereto, and switching off the electrode associated with center section 210 (FIG. 9E).

Figure 9G:
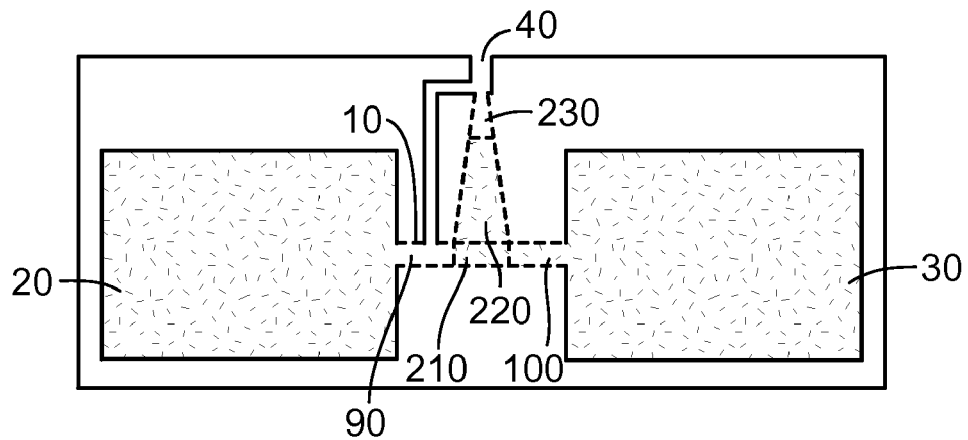
Figure 9H:
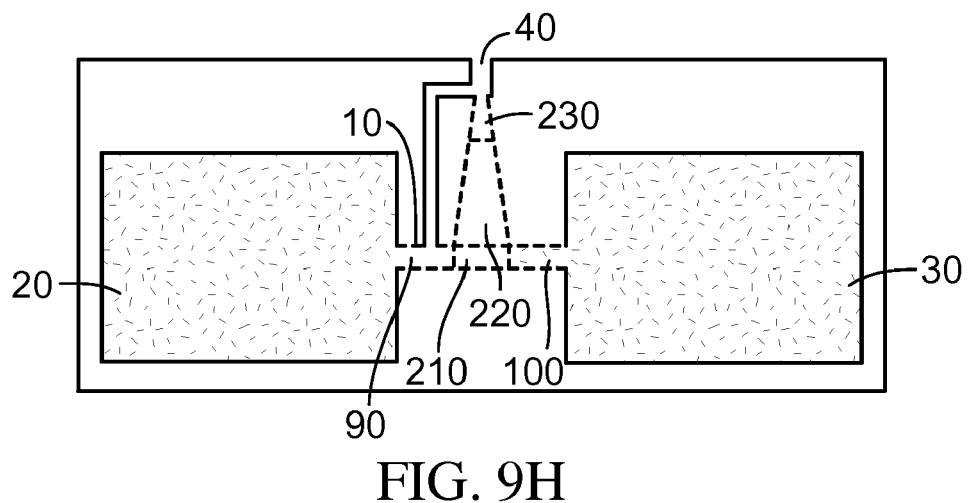
Figure 9I:
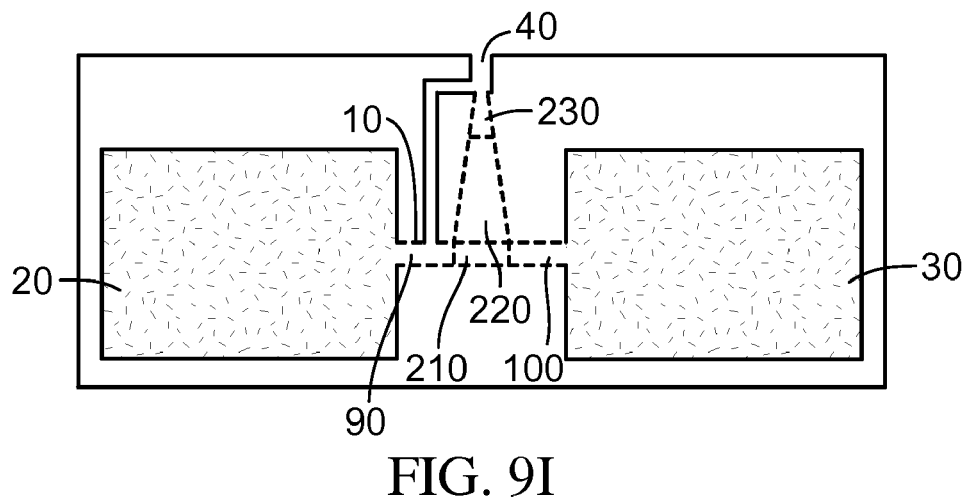

Delivery of the liquid (FIG. 9F) begins with opening the "delivery valve" by switching on the electrode associated with channel section 100. The liquid will then backflow from reservoir 30 into channel section 100. The liquid in chambers 220 and 230 is then moved to section 210 by switching off the electrode proximate to chamber 230 and switching on the electrode proximate to section 210 (FIG. 9G). The liquid is delivered to reservoir by switching off, in order, the electrode proximate to chamber 220, the electrode proximate to channel section 210, and the electrode proximate to channel section 100 (FIG. 9I). This last operation corresponds to closing the delivery valve. The pump is now in the initial configuration (stand-by), and the cycle can be restarted. In various embodiments, the pump can be operated with any sequence suitable for transporting liquid from one desired location of the pump to another.

According to various embodiments, the performance of the pump may be altered in a number of ways. For example, the shape of the electrodes and chambers may vary. An electrode could have the same area as the chamber with which it is associated, could be smaller or larger, and can take different shapes. The shape of the chambers may also vary. For example, using a trapezoidal shape for chambers 220-230 may allow for faster filling and emptying, and therefore a faster cycle.

Figure 10A:
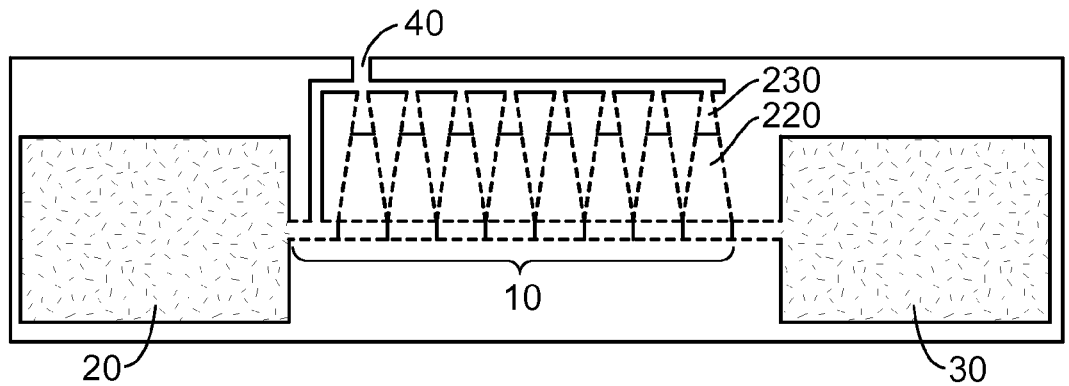
FIGS. 10A-10C illustrate various microfluidic pumps according to the present teachings.
Figure 10B:
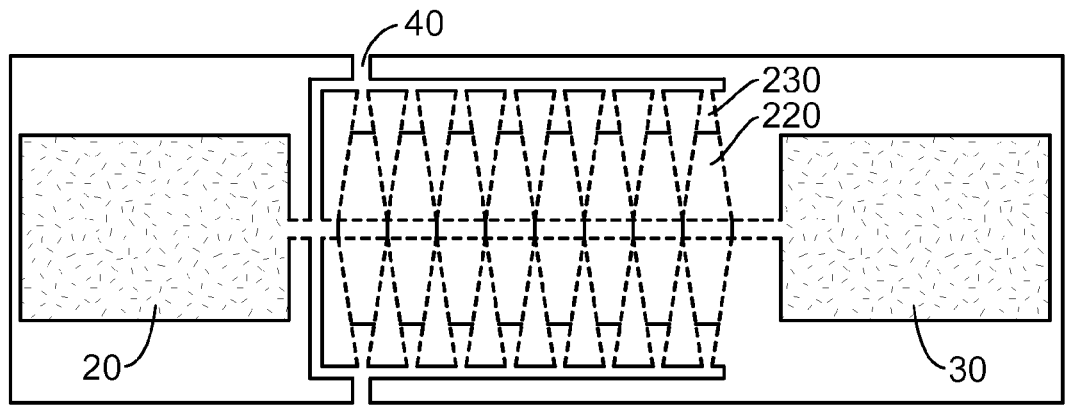
Figure 10C:
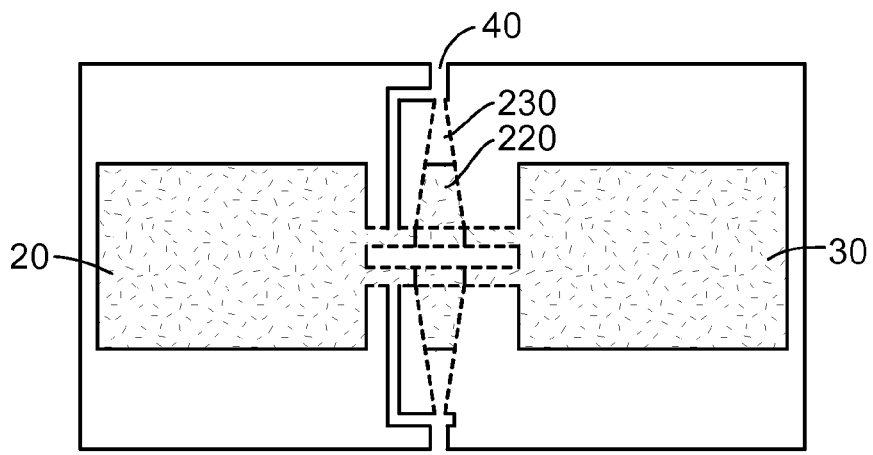

In various embodiments, there is also provided a device using an array of chambers instead of a single chamber (FIG. 10A), which may allow for a higher capacity (amount of operating liquid pumped per unit time) of the pump. Chambers can also be placed on both sides of channel 10 to double the capacity (FIG. 10B). In various embodiments, a layout containing two pumps working in opposition of phase (FIG. 10C) may allow a smoother flow.

FIG. 11 illustrates an embodiment where the actuation of the hydrophilic operating liquid is assisted by a hydrophobic liquid to provide greater capacity and delivery pressure. In the standby position (FIG. 11A), the hydrophobic liquid is contained in chamber 220. The electrodes proximate to chamber 220, channel section 90, and channel section 100 are switched off, while the electrodes proximate to chamber 230 and section 210 are switched on, effectively trapping the hydrophobic liquid in chamber 220. During the "fill" phase (FIG. 11B), the electrodes proximate to channel sections 90 and 210, and chamber 220 are switched on, and the electrode associated with chamber 230 is switched off. In this manner, the hydrophobic liquid transits to chamber 230 and the hydrophilic operating liquid flows from reservoir 20, through channel sections 90 and 210, and into chamber 220. The "fill" phase is completed by displacing the operating liquid from intake section 90 and section 210, and filling chamber 220 (FIG. 11C).

Figure 11A:
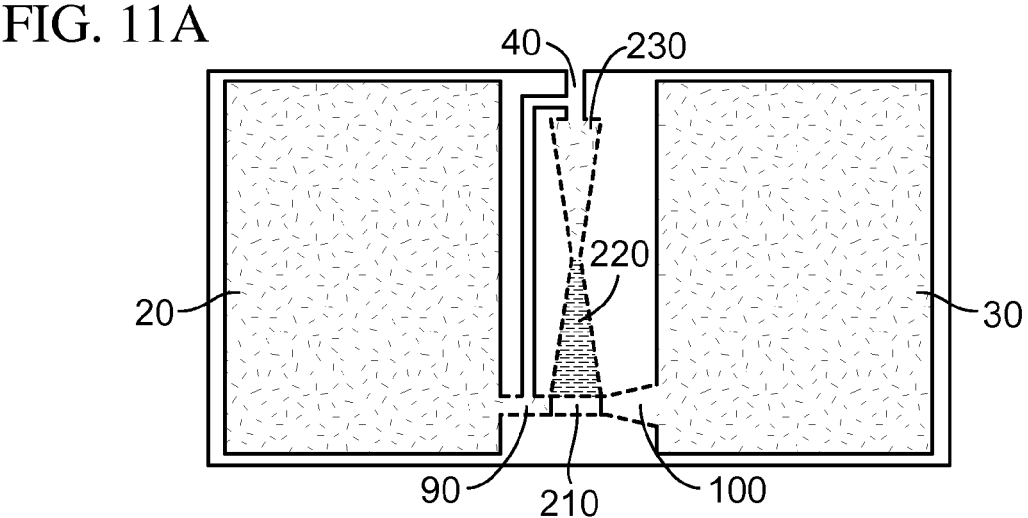
FIGS. 11A-11F illustrate the operation of a microfluidic pump according to the present teachings.
Figure 11B:
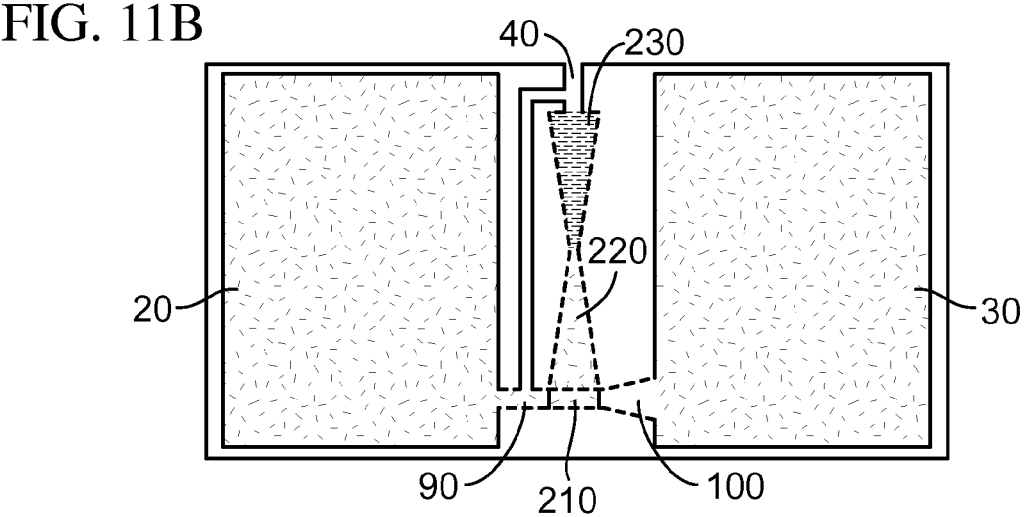
Figure 11C:
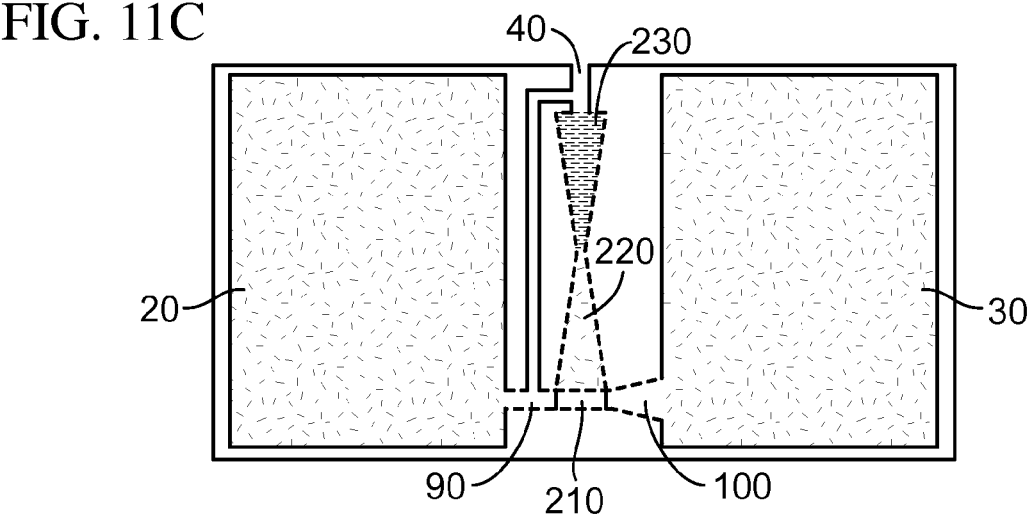
Figure 11D:
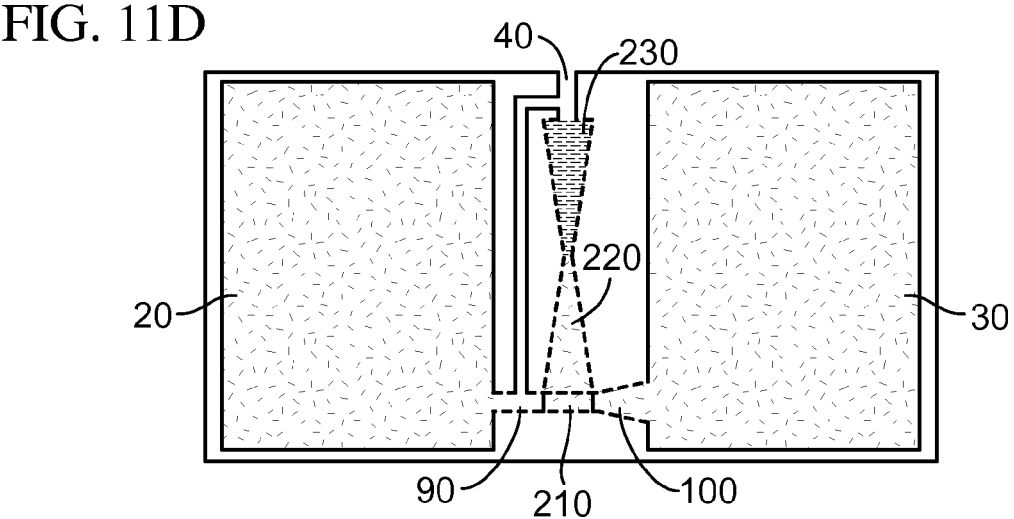
Figure 11E:
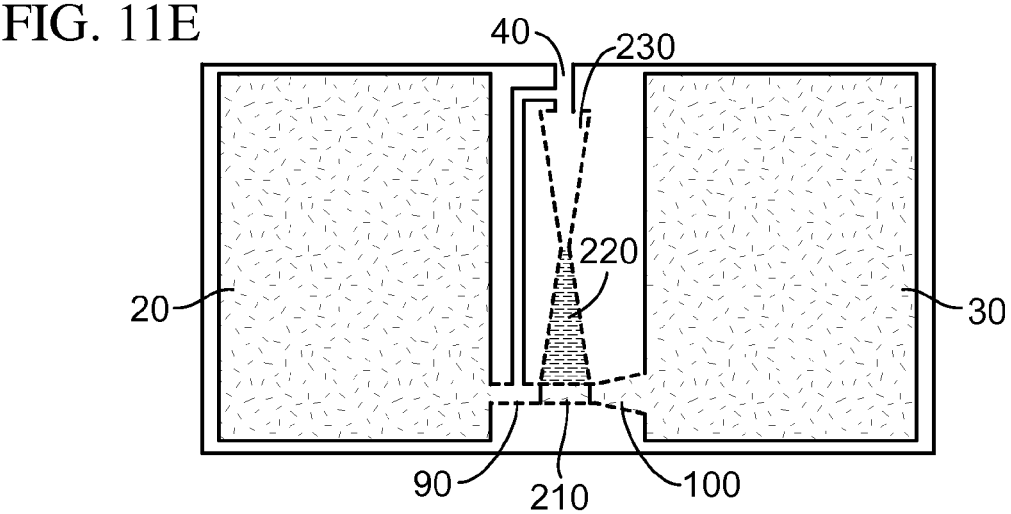
Figure 11F:
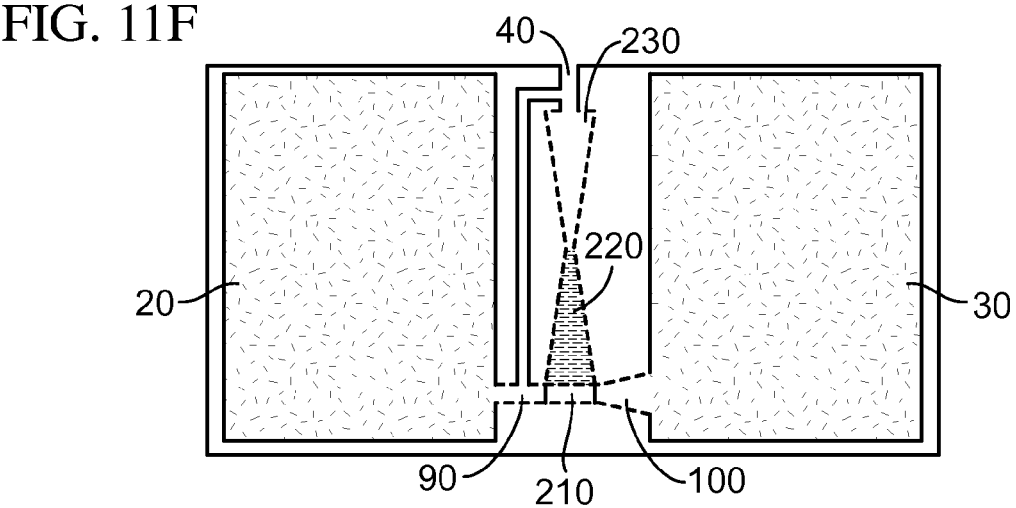

The delivery phase is initiated by switching on the electrodes proximate to channel sections 100 and 210, thereby allowing the operating liquid to flow from reservoir 20, through channel 10, and into reservoir 30 (FIG. 11D). The electrode proximate to chamber 230 is switched on and the electrode proximate to chamber 220 is switched off, effectively pumping the hydrophobic liquid from chamber 230 into chamber 220, thereby displacing the operating liquid from chamber 220 into channel 10 and reservoir 30 (FIG. 11E). The electrodes proximate to channel sections 210 and 100 are then switched off in that order, completing the delivery phase into reservoir 30 (FIG. 11F). This last operation corresponds to closing the delivery valve. The pump is now in the initial configuration (stand-by), and the cycle can be restarted.

In various embodiments, and as illustrated in FIG. 12, the delivery pressure range of a pump may be further extended by replacing channel sections 90 and 100 with elements of the microfluidic on-off valves shown in, for example, FIG. 1. FIG. 12A illustrates the standby configuration of such a microfluidic pump. Chambers 60 and 60A are filled with a hydrophobic liquid, and the electrodes proximate thereto are switched off. Chamber 50 contains the aqueous operating liquid, and its electrode is switched on.

Figure 12A:
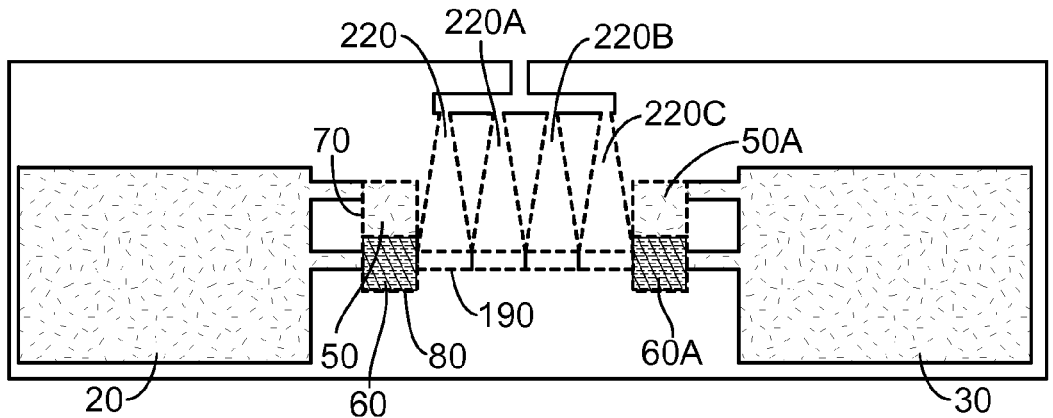
FIGS. 12A-12I illustrate the operation of a microfluidic pump containing on-off valve elements according to the present teachings.
Figure 12B:
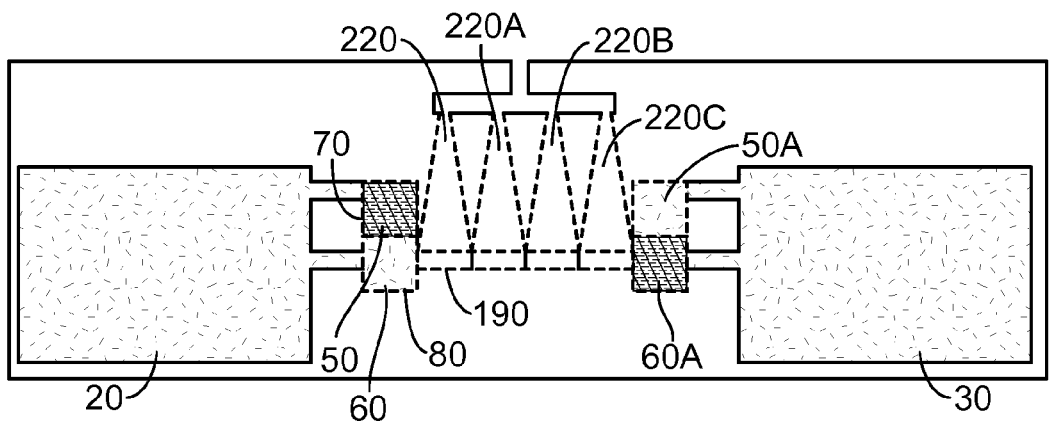
Figure 12C:
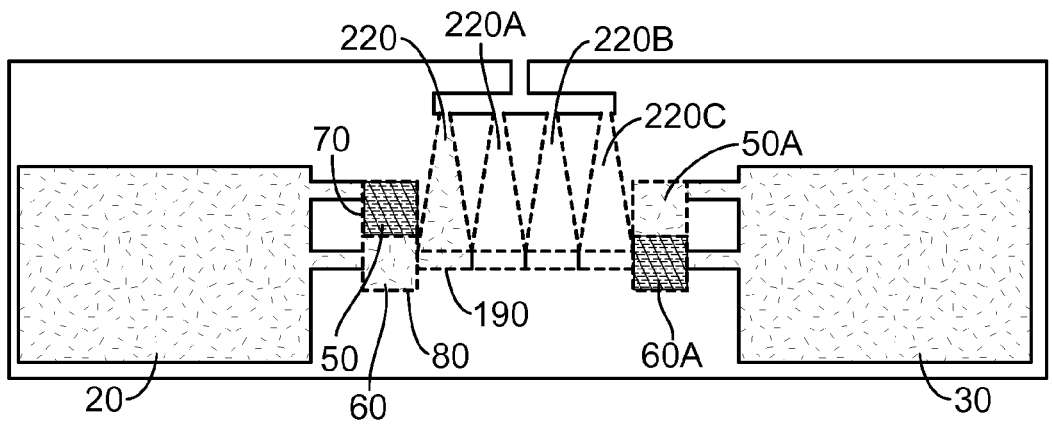
Figure 12D:
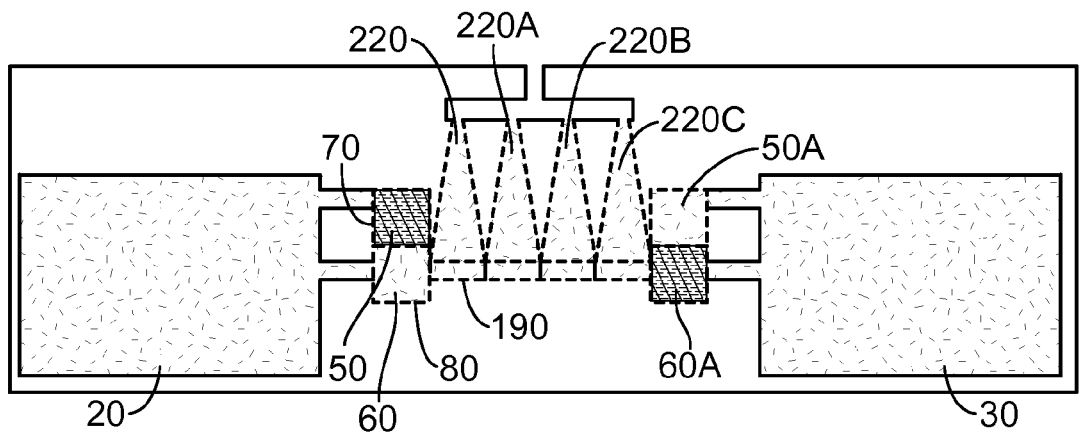
Figure 12E:
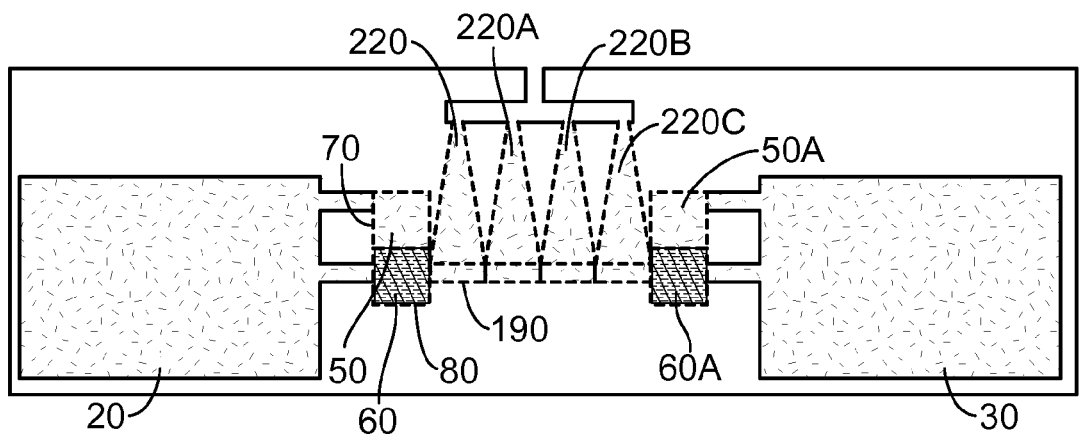
Figure 12F:
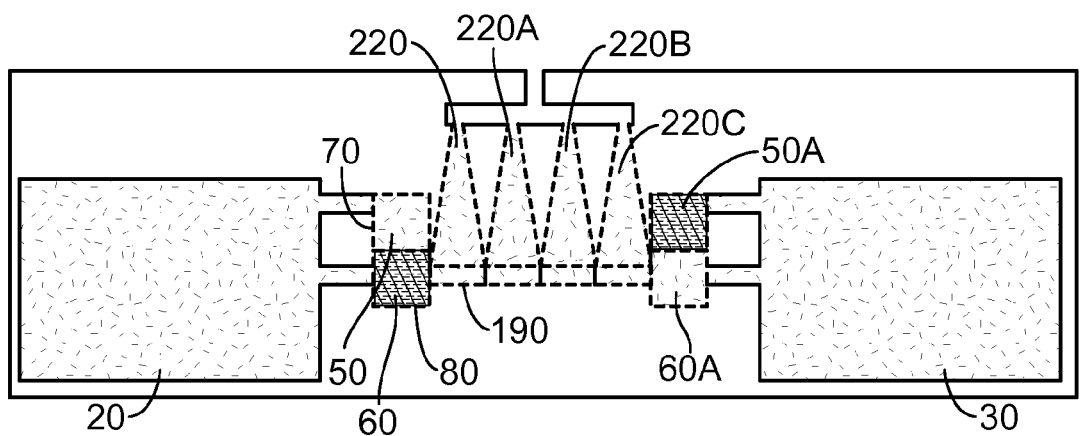

The fill phase is initiated (FIG. 12B) by switching off and on electrodes for chambers 50 and 60, respectively. The hydrophobic fluid transits from chamber 60 to chamber 50. Electrodes proximate to channel section 190 and chamber 220 are also switched on, allowing the operating liquid from reservoir 20 to flow into chamber 220 (FIG. 12C). The remaining channel sections and chambers are subsequently filled with the operating liquid by switching on their electrodes (FIG. 12D). The fill phase is completed by moving the hydrophobic liquid from chamber 50 back to chamber 60, thereby blocking the flow of the liquid from reservoir 20 (FIG. 12E).

Figure 12G:
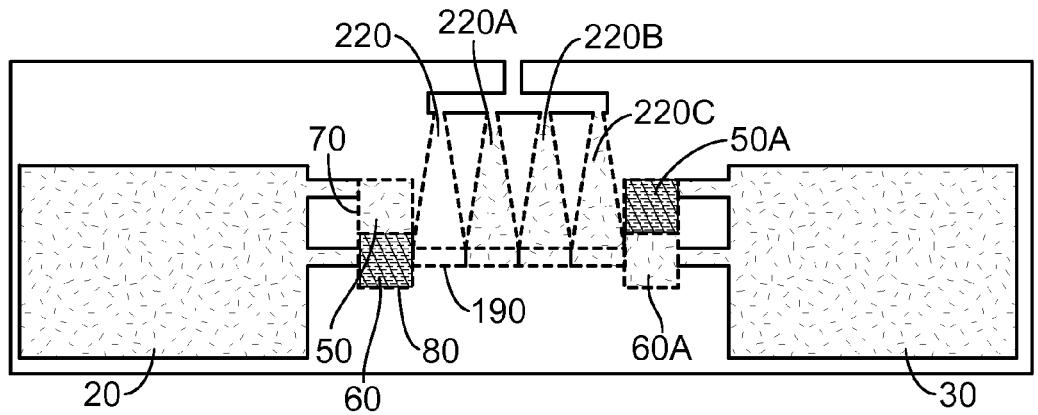
Figure 12H:
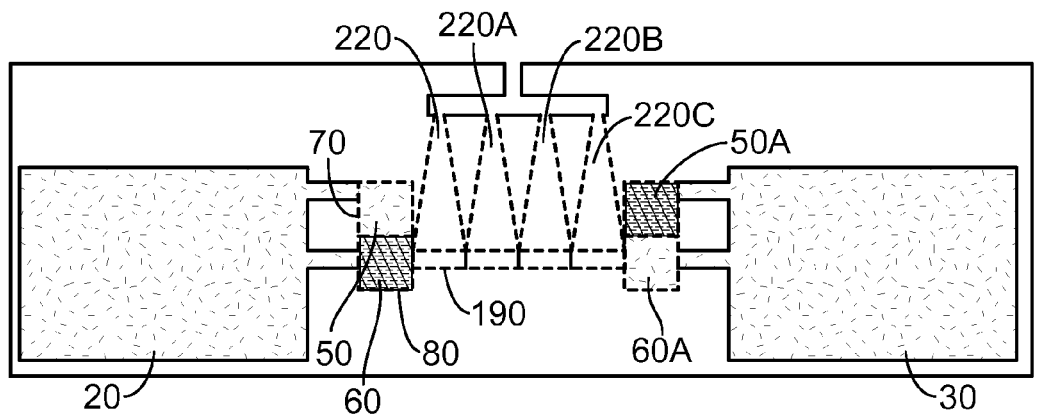
Figure 12I:
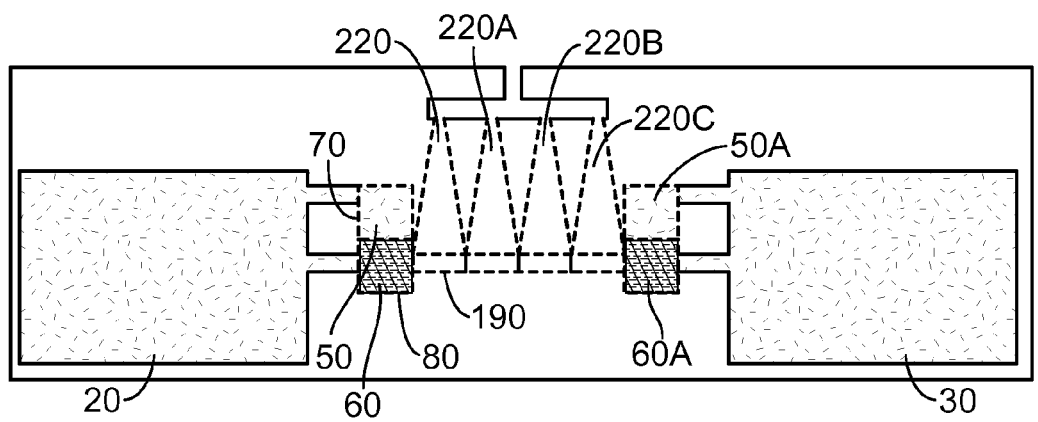

The delivery phase is initiated by moving the hydrophobic liquid from chamber 60A to 50A (FIG. 12F) and switching off the electrodes associated with the channel sections in the order shown in FIGS. 12G and 12H. This facilitates the flow of the operating liquid from the chambers and channel sections into reservoir 30. When the flow is complete, the pump is converted to its standby configuration (FIG. 12I).

Figure 13:
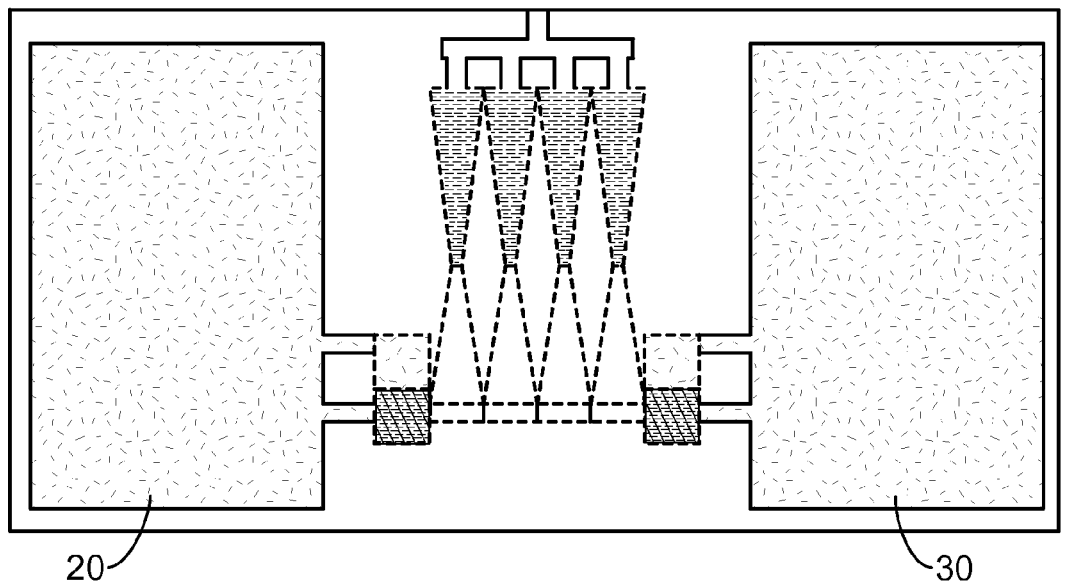
FIG. 13 illustrates a microfluidic pump according to the present teachings.

In various embodiments, FIG. 13 illustrates a microfluidic pump employing features described in, for example, FIGS. 1-12. The operation of the pump illustrated in FIG. 13 is as generally described with reference to FIGS. 1-12.

Figures 14A, 14B:
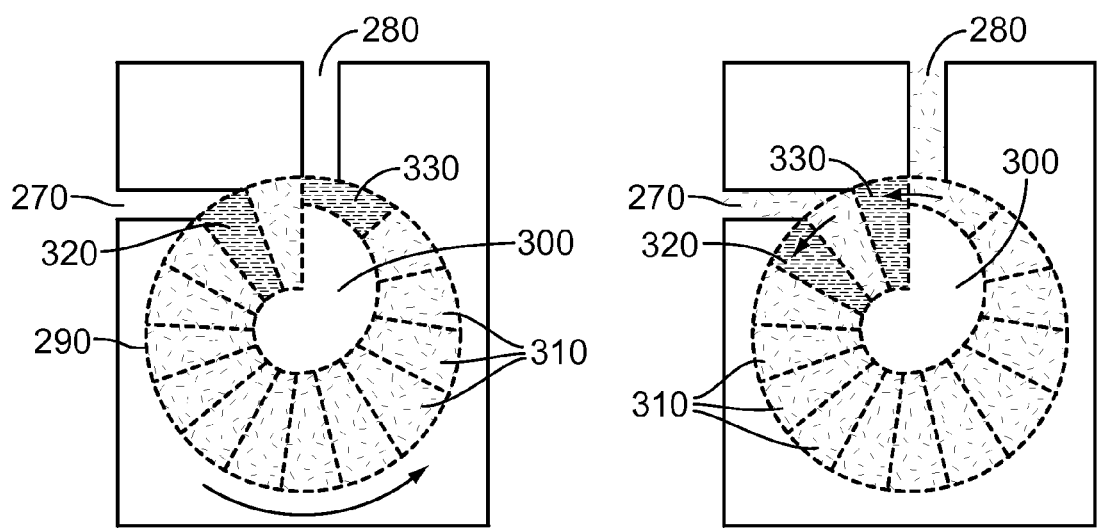
FIGS. 14A-14E illustrate the operation of a rotary vane microfluidic pump according to the present teachings.

In various embodiments, there is provided a pump operable by electrowetting. The pump, which can easily be integrated in a microfluidic chip, operates by positive displacement of an operating liquid with moving liquid vanes, while the actuation of the vanes is provided by EW and/or EWOD principles (the operating liquid is taken to be an aqueous liquid for the purposes of this illustration). Such a device is capable of delivering and metering a liquid in a single-phase form (e.g., in the absence of air bubbles). A general design of the pump is illustrated in FIG. 14A, which represents the pump in a stand-by configuration. The pump comprises an intake port 270, a delivery port 280, a chamber 290 and a hub 300, all of arbitrary shape and cross-section, and array of radial or transverse electrodes 310 covering the entire, or at least substantially entire, chamber, and two movable vanes 320 and 330. Each vane is a fluidic obstruction, e.g., a droplet of liquid, immiscible with the operating liquid and of opposite wetting characteristics (the droplets are taken to be a hydrophobic liquid for the purposes of this illustration). The actuation of the vanes, governed by EW and EWOD principles, is obtained by switching on and off in a coordinated fashion the electrical potential of the different electrodes.

In various embodiments, the chamber may be in a number of different shapes. A circular chamber may allow for a more compact pump. In addition, the spiraling shape of the hub may favor pumping action by increasing the actuation force and providing greater delivery pressure. This is achieved by exploiting the differential action of the surface tension between the leading and trailing edges of the vanes. Electrodes with slightly rounded edges may be used to increase the net pull on the vanes due to the increased curvature of the edges of the vanes.

Figure 14C:
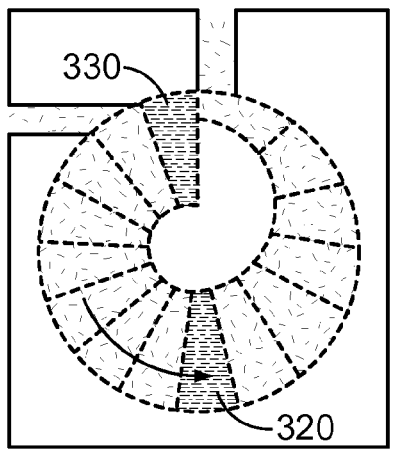
Figure 14D:
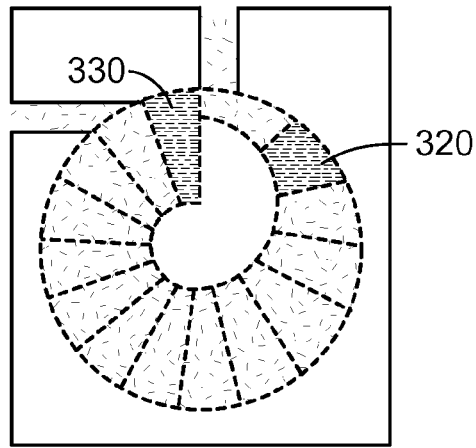
Figure 14E:
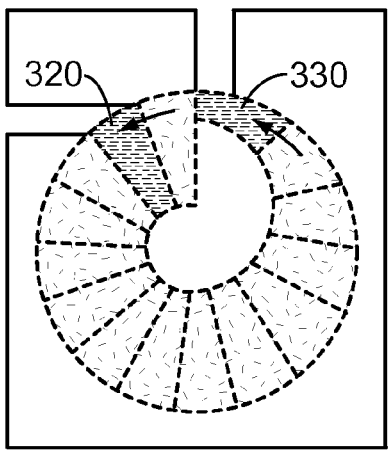

The operation of the pump may be illustrated as follows. In the stand-by configuration (FIG. 14A) the two vanes act as valves by blocking the intake and delivery ports 270 and 280, respectively. This has the effect of maintaining a pressure difference between the two ports. The pumping action commences by synchronously advancing both vanes one step, thus opening the intake and delivery ports (FIG. 14B). Consequently, the leading vane 320 is advanced toward the delivery port 280 while the trailing vane is not moved (FIG. 14C). This action provides both the delivery and the filling actions. The pumping action is complete when the leading vane is on the electrode preceding the delivery port (FIG. 14D). The final step of the sequence is the synchronous actuation of leading and trailing vanes onto the electrodes communicating with the intake and delivery ports (FIG. 14E). At this point, the leading vane has become the trailing vane, and vice versa. The initial standby configuration is restored and the pumping cycle is completed.

Figure 15A:
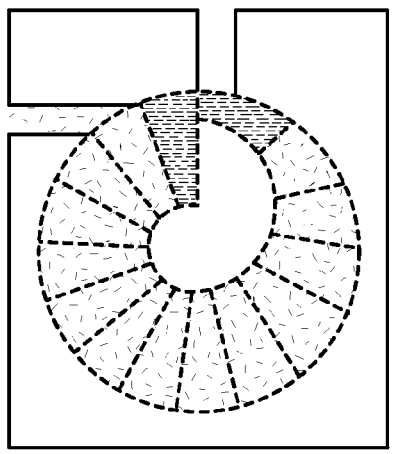
FIGS. 15A-15B illustrate the operation of a rotary vane pump where vanes are merged and split, according to the present teachings.
Figure 15B:
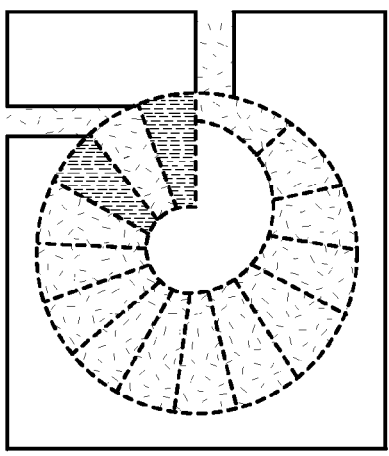

In various embodiments, the liquid vanes may be merged and split during pump operations. This design benefits from a decreased dead-volume in the chamber and an increased pumping efficiency. In the stand-by configuration (FIG. 15A), the vanes are merged and split and block the delivery. Subsequently, the vanes are moved forward by one step and split (FIG. 15B). The pumping cycle at this point is the same as the pumping cycle described with reference to FIG. 14 with the exception that at the end of the forward actuation, the leading vane meets the trailing vane and merges with it.

Figure 16:
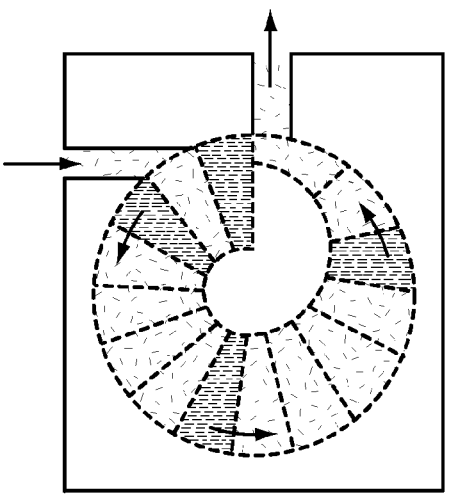
FIG. 16 illustrates the operation of a rotary vane pump employing multiple vanes, according to the present teachings.

In various embodiments, more than two vanes of immiscible droplets may be used. FIG. 16 illustrates a design employing four vanes. The arrows in the figure demonstrate the movement of the operating liquid into the intake port, through the pump, and out the delivery port. The use of, e.g., four vanes may improve both the control and the delivery speed of the pump.

In various embodiments, there is provided an EW-based passive-valve microfluidic pump. The operation of the pump, which may be integrated into a microfluidic device, is based on the combined action of an EW-actuated liquid piston in a pumping chamber and of microfluidic elements with preferential flow direction acting as passive injectors and passive valves.

Figure 17A:
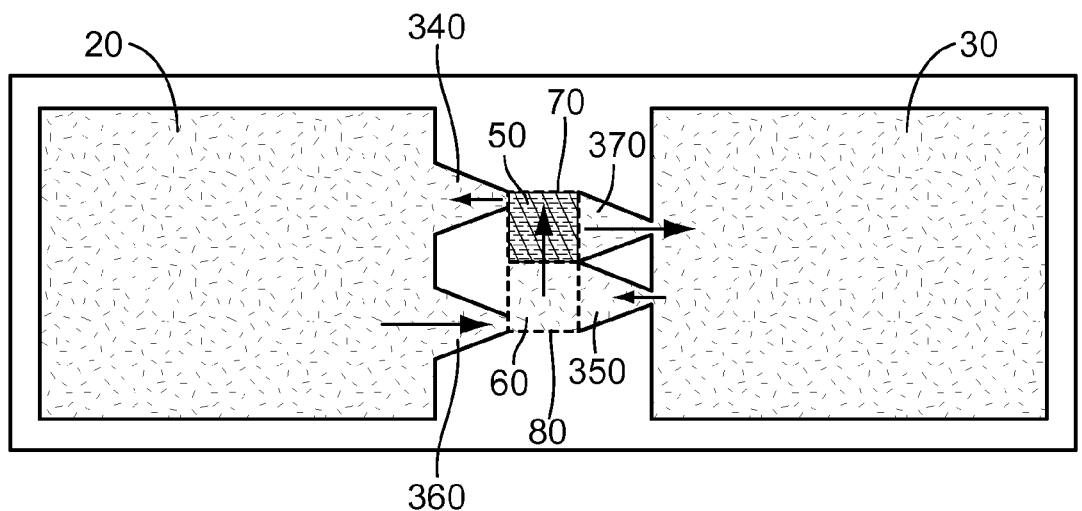
FIGS. 17A-17B illustrate a passive valve microfluidic pump according to the present teachings.

The pump, illustrated in FIG. 17A, comprises a volume subdivided into chambers 50 and 60. Electrodes 70 and 80 are proximate to chambers 50 and 60, respectively. Chamber 50 houses a liquid droplet, for example an oil droplet, immiscible with the aqueous operating liquid. The pump further comprises valves 340 and 350, and injectors 360 and 370. Each of the valves and injectors may be shaped in such a way that the flow resistance is larger for the flow in one direction relative to the opposite direction. In other words, for a given pressure drop, there is a larger flowrate when the pressure drop is applied in one direction, and a smaller flowrate for the opposite direction. A design consisting of a smooth contraction followed by a sudden expansion generates less resistance to a flow passing through it relative to a sudden contraction followed by a smooth expansion. If two such fluidic elements are placed in parallel and with opposite orientation, one may act as an "injector" and the other as a "valve."

In various embodiments, the first stroke of the two-stroke cycle is illustrated in FIG. 17A. Electrode 80 is switched on and electrode 70 is switched off. As a result, the hydrophobic liquid piston moves from chamber 60 to chamber 50. In this motion, it will displace the aqueous operating liquid out of chamber 50. Due to the valve-injector configuration of its adjacent fluidic elements, a larger amount of the operating liquid will flow to reservoir 30 than reservoir 20, resulting in a net flowrate to reservoir 30. At the same time, the motion of the liquid piston will withdraw liquid from reservoir 20 into chamber 60. The valve-injector configuration results in a net flowrate into reservoir 20. As a result, at the end of the stroke a net positive flowrate of working liquid will have occurred between reservoirs 20 and 30.

Figure 17B:
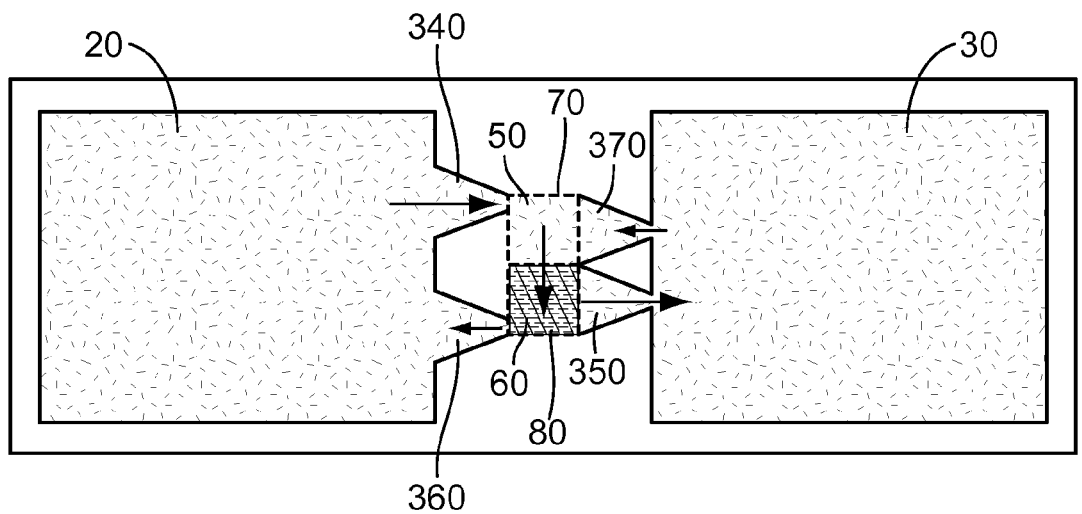

In the second stroke (FIG. 17B), electrode 70 is switched on and electrode 80 is switched off, causing a reverse motion of the liquid piston. Relative to the first stroke, the function of the fluidic elements is reversed from "injector" to "valve," and vice versa. However, due to symmetry, the resulting effect is still a net positive flowrate from the intake to delivery.

In various embodiments, the valving and pumping systems disclosed herein may operate with an operating liquid and a fluidic obstruction. The two are suitable immiscible with each other. Examples of operating liquid/fluidic obstruction pairs include hydrophilic and hydrophobic liquids, such as oil and saline. In another embodiment, the devices disclosed herein may operate with a liquid in combination with a volume of gas, for example air or an inert gas such as nitrogen.

In various embodiments, the valves and pumps disclosed herein may be operable with any fluid, for example a liquid, which is capable of being manipulated by electrowetting forces. For example, the devices may be used to manipulate a biological liquid. The term "biological liquid" as used herein refers to liquids comprising biomolecules, for example nucleic acids, peptides, and enzymes, and also refers to liquids containing bioparticles, for example cells, organelles, etc.

Liquids, including biological liquids that are electrolytic, may be used in the valving and pumping systems according the present teachings. The term "electrolytic" refers to a liquid containing substances dissolved therein, such as ionic salts, which enable the liquid to conducting an electric current. By way of non-limiting example, other liquids that may be used in the valving and pumping systems according to the present teachings can include aqueous liquids, such as water and buffered saline, as well as non-aqueous liquids such as dimethylsulfoxide, acetone, acetonitrile, and other non-aqueous solvents. For example, the aqueous and non-aqueous liquids may include, e.g., rinsing solutions.

Ionic liquids may also be used in the valving and pumping systems according to the present invention. "Ionic liquids" refers to salts that are liquid over a wide temperature range, including room temperature. The liquid can include various substances, particulate and otherwise. Such substances may include, for example, surfactants, including anionic, non-ionic, cationic, and amphoteric surfactants. The composition of the liquid, including the presence of surfactants, biomolecules, and other substances, may influence the surface wetting, and thus the contact angle, of the liquid.

In various embodiments, channels suitable for use in accordance with the present invention include any volume through which a liquid may be transported. Suitable channels may be made of glass, and may optionally be transparent, or at least partially transparent, when employed in light-actuated valves and pumps. The channels may be constructed of any material suitable for containment of a given liquid, for example glass or a polymeric material. The channels may of any dimension suitable for manipulating liquids in a desired manner. For example, according to various embodiments, the length, width and depth of the channels may range, independently, from 0.1 µm to 10 cm, for example, 10 µm to 1 cm.

In various embodiments, reservoirs suitable for use in the pumps and valves disclosed herein include any space capable of containing a liquid and communicating with at least one channel and/or additional reservoir. The reservoirs can, in practice, be any volume capable of containing a liquid such as, for example, fluidic manifolds, fluid reservoirs, ducts, channels, wells, etc. For example, the reservoirs may independently be channels fluidly connected to at least one other microfluidic device or detection element. The reservoirs may be constructed of any material capable of holding a liquid, for example glass or a polymer. The reservoir may be of any shape and of any cross section, for example it may be spherical, semi-spherical, or conical. The reservoir may be of any size sufficient to hold the desired volume of liquid. For example, the reservoir may range in size from 1 nanoliter to 1 liter.

In various embodiments, chambers suitable for use in the present disclosure include any space capable of containing a liquid and communicating with at least one channel and/or additional chamber. Typically, the chambers disclosed herein will be associated with at least one electrode capable of applying an electrical potential difference at the solid/liquid interface of the chamber. Like the reservoirs, the chambers may be constructed of any material capable of holding a liquid, for example glass, a polymer, and laminated structures comprising different materials. In various embodiments, the chamber may optionally be transparent, or at least partially transparent, when employed in light-actuated valves and pumps. The chamber may be of any shape, for example it may be spherical, semi-spherical, trapezoidal, or triangular. The chamber may be of any size sufficient to hold the desired volume of liquid. For example, the chamber may range in size from 1 nanoliter to 1 centiliter.

The electrodes may be of any material and dimensions suitable for moving a fluid by electrowetting. For example, the electrodes may be thin metal films, patterned using any thin film deposition process known in the art. The electrodes may be made from any conductive material such as, for example, copper, gold, platinum, aluminum, and conducting polymers, including polymers that are conducting per se, and conducting composites containing a non-conducting polymer and a conducting material such as a metal or a conducting polymer. The electrodes may be of any dimension suitable for transporting a liquid by EW or EWOD. For example, the electrodes may range in size from 10 µm to 5 mm on each side. In various embodiments, the edges of the electrodes have interdigitated sawtooth or meander outlines. In various embodiments, the electrode may be transparent. By way of example, the electrode may be formed of transparent indium tin oxide.

In various embodiments, the electrodes are provided as a two-dimensional matrix array. Such an array allows movement of the fluids by electrowetting in any direction on the substrate. The matrix array may comprise 4 to 10,000 individually addressable electrodes. The electrodes may be flush, or may be spaced apart by a gap. The gap may range in size from 1 µm to 2 mm. The valving and pumping systems disclosed herein may contain a volume formed by two opposing, or at least substantially opposing, surfaces. One surface may contain an electrode, or array of electrodes, and the opposing surface may comprise a ground electrode.

An insulating layer may be inserted at the interface between the droplet and the electrode to accommodate a high applied voltage without electrolysis. In various embodiments, the insulating layer is comprised of any material capable of electrically insulating the electrode. Depending on the choice of materials, it may be advantageous for the electrically insulative layer to also be chemically insulative. The chemically insulative layer may function to protect the surface from potentially corrosive effects of a liquid. According to various embodiments, it could be advantageous for the insulative layer to be made hydrophobic. This may be accomplished by selecting a hydrophobic insulative layer. Alternatively, it may be accomplished by making the insulative layer hydrophobic by, for example, binding a hydrophobic moiety to the surface. Exemplary hydrophobic moieties include silanes, siloxanes, fluorosilanes, fluorosiloxanes, hydrocarbons, fluorocarbons, combinations thereof, and polymers and copolymers of any of the foregoing. Those of ordinary skill in the art will appreciate that the selection of an appropriate insulative layer may depend on the choice of operating liquid for which the device is to be used.

Any material capable of providing an electrically and/or chemically insulative layer may be used in accordance with various embodiments. For example the insulating layer may be comprised of silicon oxide, silicon nitride, silicon oxynitride, tantalum oxide, polymers such as Parylene, Dupont Teflon AF, 3M Fluorad, 3M EGC 1700, other fluoropolymers, polysiloxanes, and carbon. The thickness of the insulative layer may range from 0.1 µm to about 200 µm.

In various embodiments, the electrodes and/or insulative coatings thereon may be textured as a way of potentially manipulating charge density. For example, the topography of the surfaces may be altered. The surface modification may involve increasing or decreasing surface roughness. Such modifications may be conducted by any known additive or subtractive methods, including depositioning, masking, and etching processes.

In various embodiments, the power source may be chosen from any source suitable for providing a sufficient electrical potential difference across a liquid in a channel or a chamber. According to one embodiment, the power source is configured to provide a direct current. According to another embodiment, for example in the case of optoelectronic devices, the power source is configured to provide an alternating current. The voltage and frequency characteristics may be chosen according to the materials used in the valving and pumping systems disclosed herein. The magnitude of the voltage source can vary according to the properties, e.g., the thickness, of the materials used to construct the device. In various embodiments, the voltage source can supply an electrical potential difference ranging from 10 volts to several hundred volts. In the case of an AC source, the frequency can range from 10 Hz to 500 kHz. In one embodiment, the voltage source is connected to the valve with only two leads. In another embodiment, the voltage source is inductively connected such that no electrical leads are required.

In various embodiments, liquids may be manipulated in the valves and pumps disclosed herein by optical activation with directed light. Optical activation may eliminate the need for individually addressed electrodes. In such an embodiment, a photoconductive material is electrically connected to both an electrode and the insulative coating. For example, the photoconductive material is disposed between the electrode and the insulative coating. The photoconductive material is activatable by directed light to provide an electrical potential difference across the insulating layer.

In various embodiments, the photoconductive material useful in the valves and pumps disclosed herein corresponds to a material with a dark conductivity ranging from $10^{-5}$ to $10^{-12}$ $\Omega^{-1} \cdot cm^{-1}$. The photoconductive material exhibits relatively low conductivity when dark, and relatively high conductivity when illuminated by a light source. In various embodiments, an example of a suitable photoconductive material is amorphous silicon, which has a dark conductivity of approximately $10^{-8}$ $\Omega^{-1} \cdot cm^{-1}$. In various embodiments, light with a wavelength ranging from 400 nm to 1100 nm is used to illuminate at least portions of the amorphous silicon. The light intensity for activating the gas-sampling device can be low. For example, a light intensity that may be suitable for switching amorphous silicon is 65 mW/cm$^2$. The layer of photoconductive material permits optical control of an electrical potential difference across a corresponding portion of the device. Optical activation of EW and EWOD devices is further discussed in U.S. Provisional Application No. 60/642, 828, filed Jan. 11, 2005, the disclosure of which is incorporated herein by reference in its entirety.

According to various embodiments, the present teachings provide pumping system including a first channel fluidly coupled to a first reservoir and a second reservoir, said first channel being divided into at least a first section, a second section, and a third section; a third reservoir opening into said second section of said first channel, said third reservoir including a first chamber and a second chamber; a plurality of electrodes including an electrode proximate to each of said first section, second section, third section, first chamber and second chamber; and a power source electrically coupled to each electrode, the power source being configured to provide an electrical potential difference at the interface between the electrode and a liquid droplet sufficient to provide a net force to move said droplet. The system can have at least one dimension of said first and second chambers of said third reservoir is triangular in shape. The system can also include an air vent fluidly coupled to at least one of said first channel, said first reservoir, and said third reservoir The system can also include a fluid in said first chamber, wherein said fluid is at least substantially immiscible with a liquid to be pumped by said system. The system can have said first channel is further divided into at least one additional section; said system contains at least one additional reservoir opening into said at least one additional section of said first channel; said at least one additional reservoir includes a first chamber and a second chamber; at least one electrode is proximate to each of at least one additional section of said first channel, and said first and second chambers of said at least one additional reservoir; and said at least one electrode is electrically coupled to said power source. The system can have at least one additional reservoir is positioned on the opposite side of said first channel from said third reservoir. The system can have a photoconductive material is electrically coupled to at least one of said electrodes. The system can also include a second channel fluidly coupled to said first reservoir and said second reservoir, said second channel being divided into at least a first section, a second section, and a third section; a fourth reservoir opening into said second section of said second channel, said fourth reservoir including a first chamber and a second chamber; and a plurality of electrodes including an electrode proximate to each of said first second, and third sections of said second channel and said first and second chambers of said fourth reservoir; wherein said plurality of electrodes is electrically connected to said power source.

According to various embodiments, the present teachings provide a pumping system suitable for a microfluidic device including a delivery channel; an intake channel; a volume fluidly connected to said delivery channel and said intake channel; a hub extending through said volume; a plurality of electrodes proximate to said volume; and a power source electrically coupled to each electrode, the power source being configured to provide an electrical potential difference at the interface between the electrode and a liquid droplet sufficient to provide a net force to move said droplet. The system can have said volume has a circular shape. The system can have said hub has a spiral shape. The system can have said electrodes have at least one circular edge. The system can have said volume is bounded by a first surface and an opposed and parallel second surface. The system can have said first surface includes said plurality of electrodes. The system can have a photoconductive material is electrically coupled to at least one of said electrodes.

According to various embodiments, the present teachings provide a pumping system suitable for a microfluidic device including a first reservoir; a second reservoir; a volume between the two reservoirs adapted to contain an fluid chosen from a gas bubble and a liquid droplet; at least one electrode proximate to said volume; a first channel and a second channel allowing liquid to flow between said first reservoir and said volume; a third channel and a fourth channel allowing liquid to flow between said second reservoir and said volume; and a power source electrically coupled to each electrode, the power source being configured to provide an electrical potential difference at the interface between the electrode and a liquid droplet sufficient to provide a net force to move said droplet. The system can have at least one of said channels has a triangular dimension. The system can have at least one of said channels is conical in shape. The system can have each of said channels is conical in shape. The system can have said volume includes a first chamber and a second chamber. The system can have said volume includes a first surface and an opposing, parallel second surface. The system can have said second surface includes a ground electrode. The system also including a liquid disposed in one of said first and second chambers, wherein said liquid is substantially immiscible with a liquid to be pumped by said system. The system can have a photoconductive material is electrically coupled to at least one of said electrodes.

According to various embodiments, the present teachings provide a process for controlling the flow of a liquid from a reservoir to a channel, wherein: said reservoir is fluidly connected to said channel; a first electrode is proximate to said reservoir and the intersection of said reservoir and said channel; a second electrode is proximate to said channel and is proximate to, and in substantially the same plane as, said first electrode; a fluidic obstruction substantially immiscible with said liquid is located proximate to at least one of said first and second electrodes; and a power source is electrically connected to said first and second electrodes to form first and second circuits, respectively; said process including alternately opening and closing said circuits to alternately cause said fluidic obstruction to transit between the surfaces of said first and second electrodes, thereby alternately blocking the flow of said liquid from said reservoir into said channel. The process can have said first and second electrodes have adjoining edges. The process can also include at least one ground electrode in spatial opposition to said first and second electrodes. The process can have said liquid is a hydrophilic liquid and said fluidic obstruction is a hydrophobic liquid droplet. The process can have said liquid is a hydrophobic liquid and said fluidic obstruction is a hydrophilic liquid droplet. The process can have closing the circuit to the first electrode and opening the circuit to the second electrode results in the movement of the fluidic obstruction away from the first electrode and towards the second electrode. The process can have opening the circuit to the first electrode and closing the circuit to the second electrode results in the movement of the fluidic obstruction away from the second electrode and towards the first electrode. The process can have a photoconductive material is electrically connected to at least one of said first and second circuits, and wherein said at least one circuit is alternately opened and closed by alternately directing light upon said photoconductive material.

According to various embodiments, the present teachings provide a process for controlling the flow of a liquid from a first reservoir to a second reservoir in an apparatus including a channel disposed between, and in fluid communication with, a first reservoir and a second reservoir; a volume between said first and second reservoirs, wherein said volume includes a first chamber and a second chamber, and said second chamber includes at least a portion of said channel, and wherein one of said first and second chambers includes a fluidic obstruction substantially immiscible with said liquid; a first electrode proximate to said first chamber, and a second electrode proximate to said second chamber; and a power source electrically connected to said first and second electrodes to form a first circuit between said power source and said first electrode, and a second circuit between said power source and said second electrode, said process including alternately opening and closing said first and second circuits to cause said fluidic obstruction to transit between said first chamber and said second chamber. The process can have the flow of the liquid from the first reservoir to the second reservoir is blocked when the fluidic obstruction is in said second chamber. The process can also include at least one ground electrode in spatial opposition to said first and second electrodes. The process can have said liquid is a hydrophilic liquid, and said fluidic obstruction is a hydrophobic liquid droplet. The process can have said liquid is a hydrophobic liquid and said fluidic obstruction is a hydrophilic liquid droplet. The process can have closing the circuit to the first electrode and opening the circuit to the second electrode results in the movement of the fluidic obstruction from the first chamber into the second chamber. The process can have opening the circuit to the first electrode and closing the circuit to the second electrode results in the movement of the fluidic obstruction from the second chamber into the first chamber. The process can have wherein a photoconductive material is electrically connected to each of said first and second circuits, and wherein the first and second circuits are alternately opened and closed by alternately directing light upon said photoconductive material.

According to various embodiments, the present teachings provide a process for pumping a liquid from a first volume to a second volume including providing a fluid substantially immiscible with said liquid in a third volume, wherein said third volume is disposed between, and in fluid communication with, said first and second volumes, and wherein said third volume includes a first chamber and a second chamber; alternately applying an electric current across said first and second chambers, thereby causing the fluid to alternately transit between said first and second chambers, thereby drawing the liquid from said first volume, through at least a portion of said third volume, and into said second volume. The process can have said liquid is a hydrophilic liquid, and said fluid is a hydrophobic liquid droplet. The process can have said liquid is a hydrophobic liquid and said fluid is a hydrophilic liquid droplet. The process can have said electric current is alternately applied across said first and second chambers by optical activation of a photoconductive material.

According to various embodiments, the present teachings provide a process for pumping a liquid from a first reservoir to a second reservoir, wherein: a channel fluidly connects said first reservoir to said second reservoir; a third volume including a first chamber and a second chamber opens into said channel; a first electrode is proximate to said first chamber; a second electrode is proximate to, and in substantially the same plane as, said second chamber; a fluid substantially immiscible with the liquid is located in one of said first and second chambers; and a power source is electrically connected to said first and second electrodes to form a first circuit between said power source and said first electrode, and a second circuit between said power source and said second electrode, said process including alternately opening and closing said first and second circuits to cause said fluid to transit between said first chamber and said second chamber, thereby drawing the liquid from said first reservoir, through said channel, and into said second reservoir. The process can also include at least one ground electrode in spatial opposition to said first and second electrodes. The process can have said liquid is a hydrophilic liquid, and said fluid is a hydrophobic liquid droplet. The process can have said liquid is a hydrophobic liquid and said fluid is a hydrophilic liquid droplet. The process can have closing the circuit to the first electrode and opening the circuit to the second electrode results in the movement of the fluid from the first chamber and into the second chamber. The process can have opening the circuit to the first electrode and closing the circuit to the second electrode results in the movement of the fluid from the second chamber and into the first chamber. The process can have a photoconductive material is electrically connected to said first and second circuits, and wherein the first and second circuits are opened and closed by alternately directing light upon said photoconductive material.

According to various embodiments, the present teachings provide a process for pumping a liquid in an apparatus including a reservoir including a first surface, an opposing second surface, and a hub disposed between said first and second surfaces; a first channel and a second channel, each of which is in independent fluid communication with said reservoir; a plurality of electrodes disposed in substantially the same plane under said first surface, wherein said plurality of electrodes is arranged around said hub; a power source electrically connected to each of said electrodes; and at least one vane including a fluid substantially immiscible with said liquid, wherein said at least one vane is disposed over at least one of said plurality of electrodes; said process including alternately applying an electric current to said electrodes to cause said at least one vane to transit around said hub, thereby drawing the liquid from said first channel, into said reservoir, and out said second channel. The process can also include at least one ground electrode in spatial opposition to said plurality of electrodes. The process can have said liquid is a hydrophilic liquid, and said fluid is a hydrophobic liquid droplet. The process can said liquid is a hydrophobic liquid and said fluid is a hydrophilic liquid droplet. The process can have the apparatus further includes a photoconductive material electrically connected to said power source and said plurality of electrodes, and the electric current is applied by directing light upon said photoconductive material.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "less than 10" includes any and all subranges between (and including) the minimum value of zero and the maximum value of 10, that is, any and all subranges having a minimum value of equal to or greater than zero and a maximum value of equal to or less than 10, e.g., 1 to 5.

It is noted that, as used in this specification and the appended claims, the singular forms "a," "an," and "the," include plural referents unless expressly and unequivocally limited to one referent. Thus, for example, reference to "a charged species " includes two or more different charged species. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to various embodiments described herein without departing from the spirit or scope of the present teachings. Thus, it is intended that the various embodiments described herein cover other modifications and variations within the scope of the appended claims and their equivalents.

What is claimed is:

1. A valving system comprising:
a channel fluidly coupled to a first reservoir and a second reservoir;
a volume in fluid communication with said channel;
a fluidic obstruction configured to be included in the volume,
wherein the fluidic obstruction is configured to move to a first position and a second position,
wherein the fluidic obstruction is configured to block the channel to prevent fluid communication between the first and second reservoir when the fluidic obstruction is in the second position, and
wherein the fluidic obstruction is a fluid selected from a liquid droplet and a gas bubble;
a first electrode proximate to said volume;
a second electrode proximate to said channel, wherein said first and second electrodes are proximate to each other; and
a power source electrically coupled to the first and second electrode, the power source being configured to provide an electrical potential difference at the interface between the electrode and the fluidic obstruction sufficient to provide a net force to move the fluidic obstruction within the volume.

2. The system according to claim 1 further comprising a second channel, wherein said second channel is at least one of vented to the atmosphere, fluidly coupled to said volume, fluidly coupled to said first reservoir, fluidly coupled to said second reservoir, fluidly coupled to another fluidic component, and blind.

3. The system according to claim 2, further comprising an electrode proximate to at least a portion of said second channel.

4. The system according to claim 2, further comprising a third channel.

5. The system according to claim 4, wherein said third channel is fluidly coupled to said first channel and at least one of the atmosphere, said first reservoir, said second reservoir, and an additional fluidic component.

6. The system according to claim 4, wherein at least one dimension of at least a portion of said volume is trapezoidal in shape.

7. The system according to claim 1, wherein said first and second electrodes have adjoining edges.

8. The system according to claim 1, wherein at least a portion of the channel is hydrophilic.

9. The system according to claim 1, wherein at least a portion of the channel is hydrophobic.

10. The system according to claim 1, further comprising at least one additional electrode in said channel.

11. The system according to claim 1, wherein at least one dimension of at least a portion of said volume is trapezoidal in shape.

12. The system according to claim 1, wherein a photoconductive material is electrically coupled to at least one of said first and second electrodes.

13. A valving system comprising:
a first channel fluidly coupled to a first reservoir;
a second channel fluidly coupled to said first channel, said second channel having a first volume;
a first fluid obstruction included in the first volume,
wherein the first fluidic obstruction is configured to move to a first position and a second position in the first volume,
wherein the first fluidic obstruction is configured to block the second channel to prevent fluid communication between the first and second channels when the first fluidic obstruction is in the second position in the first volume, and
wherein the first fluidic obstruction is a fluid selected from a liquid droplet and a gas bubble;
a second volume comprising said first volume and at least a portion of said first channel;
a third channel fluidly coupled to said second volume, wherein said third channel comprises at least one section;
a third volume opening into said at least one section;
a fourth channel fluidly coupled to a second reservoir;
a fifth channel fluidly coupled to said first channel, said fifth channel having a fourth volume;
a second fluid obstruction included in the fourth volume,
wherein the second fluidic obstruction is configured to move to a first position and a second position in the fourth volume,
wherein the second fluidic obstruction is configured to block the fifth channel to prevent fluid communication between the first and fifth channels when the second fluidic obstruction is in the second position in the fourth volume, and
wherein the second fluidic obstruction is a fluid selected from a liquid droplet and a gas bubble;
a fifth volume comprising said fourth volume and at least a portion of said fourth channel;
an electrode proximate to each of said volumes and channels; and
a power source electrically coupled to each electrode, the power source being configured to provide an electrical potential difference at the interface between the electrode and the first and second fluidic obstructions sufficient to provide a net force to move the first fluidic obstruction within the first volume and the second fluidic obstruction within the fourth volume.

14. The system according to claim 13, further comprising an air vent fluidly connected to said third volume.

15. The system according to claim 13, further comprising at least one additional volume opening into at least one additional section of said third channel, and an electrode proximate to said at least one additional volume.

16. The system according to claim 15, further comprising an air vent fluidly connected to said at least one additional volume.

17. The system according to claim 15, wherein said at least one additional volume comprises a first chamber and a second chamber, and an electrode is proximate to each of said chambers.

18. The system according to claim 17, wherein said first chamber contains a fluid substantially immiscible with a liquid to be pumped by said system.

19. The system according to claim 13, wherein said third volume comprises a first chamber and a second chamber, and an electrode is proximate to each of said chambers.

20. The system according to claim 19, wherein said first chamber contains a fluid substantially immiscible with a liquid to be pumped by said system.

21. The system according to claim 13, wherein a photoconductive material is electrically coupled to at least one of said electrodes.

22. A valving system comprising:
a reservoir, a channel fluidly connected to said reservoir,
a fluidic obstruction configured to be included in the channel,
   wherein the fluidic obstruction is configured to move to a first position and a second position,
   wherein the fluidic obstruction is configured to block the channel to prevent fluid communication between the reservoir and the channel when the fluidic obstruction is in the second position, and
   wherein the fluidic obstruction is a fluid selected from a liquid droplet and a gas bubble;
at least one electrode associated with said channel, said electrode being proximate to the intersection of said reservoir and said channel; and
a power source electrically coupled to said at least one electrode, the power source being configured to provide an electrical potential difference at the interface between the electrode and the fluidic obstruction sufficient to provide a net force to move the fluidic obstruction.

23. The system according to claim 22, comprising:
a plurality of channels fluidly connected to said reservoir;
at least one electrode associated with each channel, each of said electrodes being proximate to the intersection of the reservoir and one of said plurality of channels.

24. The system according to claim 22, wherein a photoconductive material is electrically connected to the at least one electrode.

25. A valving system comprising:
a channel fluidly coupled to a reservoir;
a plurality of electrodes comprising:
a first electrode proximate to said channel;
a second electrode proximate to an edge of said first electrode and proximate to said reservoir;
a third electrode proximate to an edge of said second electrode and proximate to said reservoir;
a fluidic obstruction configured to move to a first position, a second position, and a third position, wherein the fluidic obstruction is configured to block the channel to prevent fluid communication between the reservoir and the channel when the fluidic obstruction is in the third position, and wherein the fluidic obstruction is a fluid selected from a liquid droplet and a gas bubble; and
a power source electrically coupled to each electrode, the power source being configured to provide an electrical potential difference at the interface between the electrode and the fluidic obstruction sufficient to provide a net force to move the fluidic obstruction.

26. The system according to claim 25, wherein said second electrode adjoins an edge of said first electrode.

27. The system according to claim 26, wherein said third electrode adjoins an edge of said second electrode.

28. The system according to claim 25, wherein a photoconductive material is electrically connected to the at least one electrode.

* * * * *